US012617155B1

(12) United States Patent
Alkhalifa et al.

(10) Patent No.: US 12,617,155 B1
(45) Date of Patent: May 5, 2026

(54) ADAPTIVE OBJECT FABRICATION USING ENRICHED VOXEL-BASED DIGITAL TWINS AND AI-GUIDED MATERIAL SUBSTITUTION

(71) Applicant: SGM Infotech, LLC, Ashburn, VA (US)

(72) Inventors: Abubakr Y. Alkhalifa, Alpharetta, GA (US); Mohamed Yousif Elkhalifa, Alpharetta, GA (US)

(73) Assignee: SGM Infotech, LLC, Ashburn, VA (US)

( * ) Notice: Subject to any disclaimer, the term of this patent is extended or adjusted under 35 U.S.C. 154(b) by 0 days.

(21) Appl. No.: 19/297,018

(22) Filed: Aug. 12, 2025

(51) Int. Cl.
B29C 64/386 (2017.01)
B33Y 50/00 (2015.01)
G06T 17/20 (2006.01)

(52) U.S. Cl.
CPC ............ B29C 64/386 (2017.08); B33Y 50/00 (2014.12); G06T 17/20 (2013.01)

(58) Field of Classification Search
CPC ........ B29C 64/386; B33Y 50/00; G06T 17/20
See application file for complete search history.

(56) References Cited

FOREIGN PATENT DOCUMENTS

WO      WO-2025151122 A1 *   7/2025   ............. B33Y 50/00

OTHER PUBLICATIONS

Rojek (Rojek, I., Marciniak, T., & Mikołajewski, D. (2024). Digital twins in 3D printing processes using artificial intelligence. Electronics, 13(17), 3550.) (Year: 2024).*

Chan (Chan, H. K., Guo, M., Zeng, F., Chen, Y., Xiao, T., & Griffin, J. (2023). Blockchain-enabled authentication platform for the protection of 3D printing intellectual property: a conceptual framework study. Enterprise Information Systems, 17(11), 2180776.) (Year: 2023).*

* cited by examiner

*Primary Examiner* — Bijan Mapar

(74) *Attorney, Agent, or Firm* — H. Brock Kolls

(57)                ABSTRACT

The present invention relates to adaptive object fabrication using enriched digital twins that incorporate voxel-based metadata tailored to environmental conditions and material performance. A machine-learned artificial intelligence (AI) engine selects substitute materials and predicts failure modes based on environmental context data, such as temperature, vibration, and chemical exposure. These insights are embedded into a voxel-based model as prescriptive metadata, generating an enriched digital twin configured for precise additive manufacturing. Secure transmission, cryptographic authorization, and compliance indexing ensure controlled and traceable fabrication. Unlike prior approaches, the system transforms digital twins into machine-executable fabrication directives that adapt dynamically to deployment-specific requirements. The invention enables context-aware object replication with improved survivability, regulatory compatibility, and manufacturing efficiency.

20 Claims, 14 Drawing Sheets

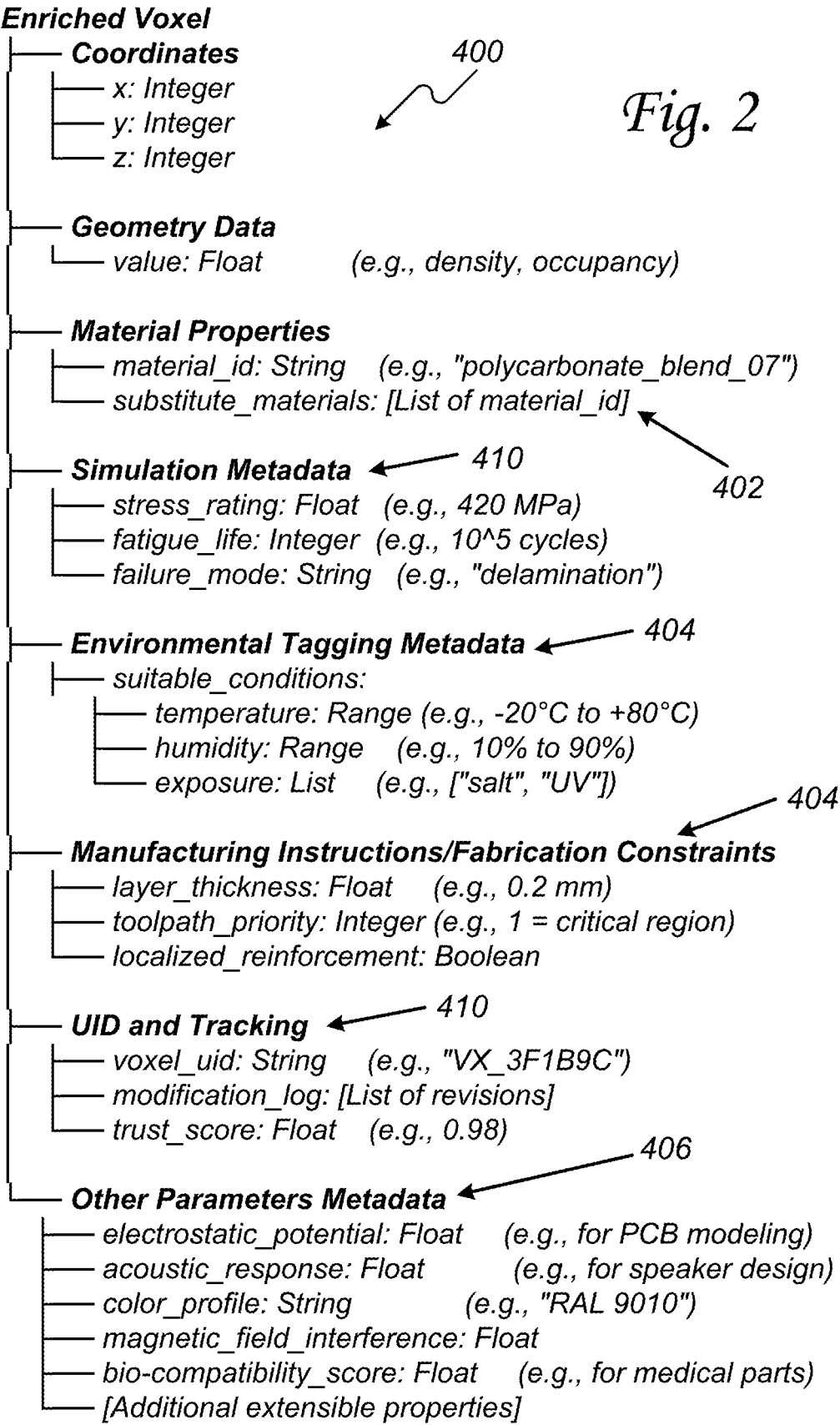

*Fig. 2*

Enriched Voxel
- Coordinates  *400*
  - *x: Integer*
  - *y: Integer*
  - *z: Integer*
- Geometry Data
  - *value: Float*    (e.g., density, occupancy)
- Material Properties
  - *material_id: String*    (e.g., "polycarbonate_blend_07")
  - *substitute_materials: [List of material_id]*  *402*
- Simulation Metadata  *410*
  - *stress_rating: Float*    (e.g., 420 MPa)
  - *fatigue_life: Integer*    (e.g., 10^5 cycles)
  - *failure_mode: String*    (e.g., "delamination")
- Environmental Tagging Metadata  *404*
  - *suitable_conditions:*
    - *temperature: Range* (e.g., -20°C to +80°C)
    - *humidity: Range*    (e.g., 10% to 90%)
    - *exposure: List*    (e.g., ["salt", "UV"])  *404*
- Manufacturing Instructions/Fabrication Constraints
  - *layer_thickness: Float*    (e.g., 0.2 mm)
  - *toolpath_priority: Integer* (e.g., 1 = critical region)
  - *localized_reinforcement: Boolean*
- UID and Tracking  *410*
  - *voxel_uid: String*    (e.g., "VX_3F1B9C")
  - *modification_log: [List of revisions]*
  - *trust_score: Float*    (e.g., 0.98)  *406*
- Other Parameters Metadata  *406*
  - *electrostatic_potential: Float*    (e.g., for PCB modeling)
  - *acoustic_response: Float*    (e.g., for speaker design)
  - *color_profile: String*    (e.g., "RAL 9010")
  - *magnetic_field_interference: Float*
  - *bio-compatibility_score: Float*    (e.g., for medical parts)
  - *[Additional extensible properties]*

*Fig. 3*

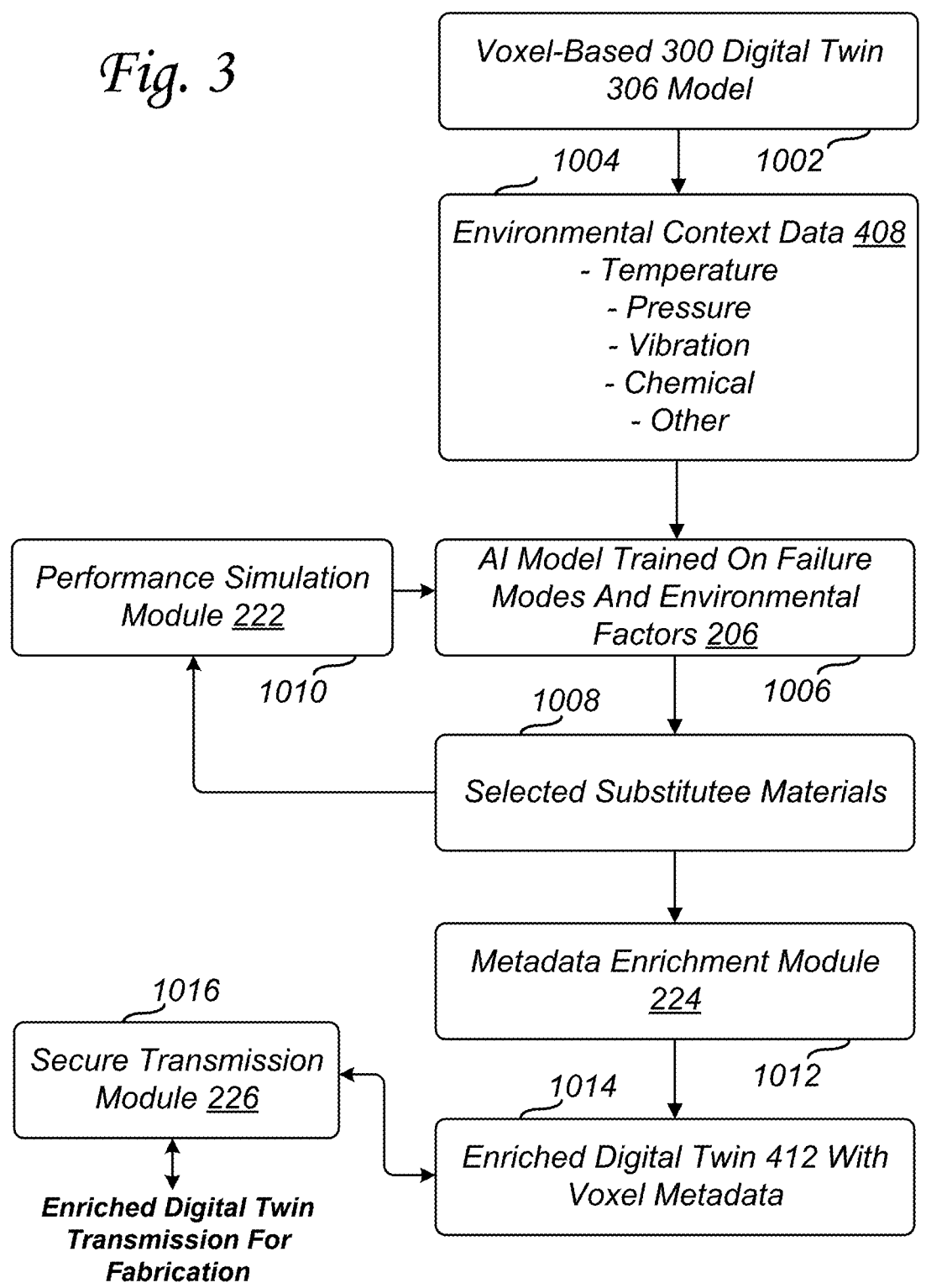

Voxel-Based 300 Digital Twin 306 Model 1004          1002

Environmental Context Data 408
- Temperature
- Pressure
- Vibration
- Chemical
- Other Performance Simulation Module 222

AI Model Trained On Failure Modes And Environmental Factors 206

1010          1008          1006

Selected Substitutee Materials

Metadata Enrichment Module 224

1016

Secure Transmission Module 226

1014          1012

Enriched Digital Twin 412 With Voxel Metadata

Enriched Digital Twin Transmission For Fabrication

200

202

Remote Data Processing Resource/Server

*Creating Digital Twin From Physical Products*

304

212

208A

Voxel Model Generator

216

218/222/224/226/228

220

LAN/WAN Communications 210

204

Design Repository

206

Machine-Learned AI Processing

Module For Generating Enriched Version Of The Digital Twin

214

Additive Manufacturing Systems

302

208A

208B

Administration/ Manual Override

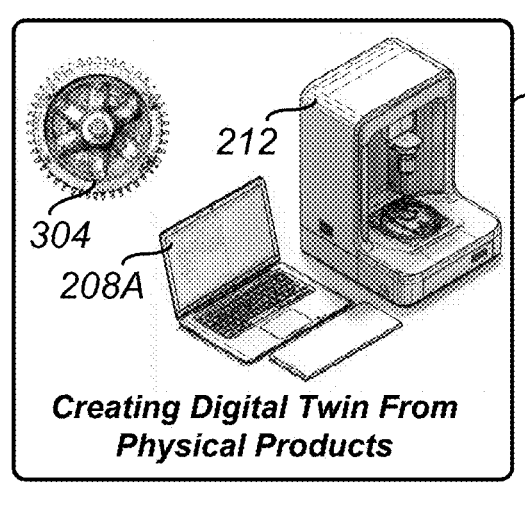
*220*
*212*
*304*
*208A*
Creating Digital Twin From Physical Products
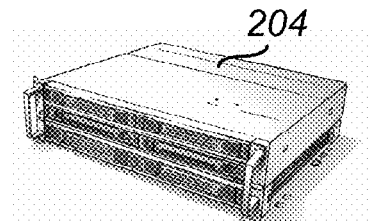
*204*
Storing Digital Twins In A Design Repository
*208A*
*302*
Receiving Digital Twin And Environmental Context
*216*
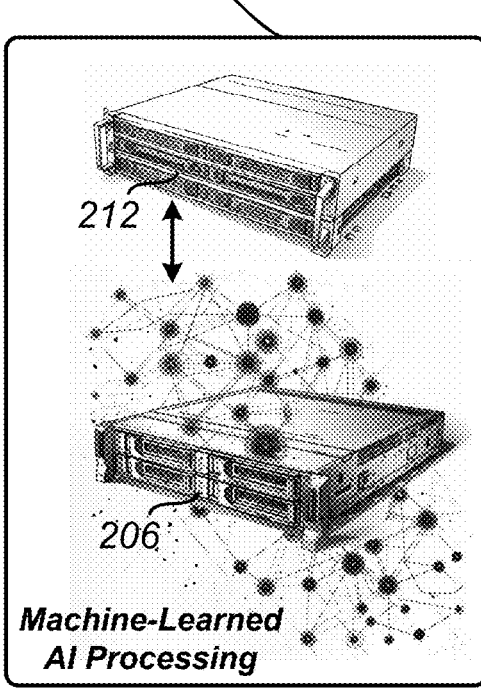
*212*
*206*
Machine-Learned AI Processing
Module For Generating Enriched Version Of The Digital Twin
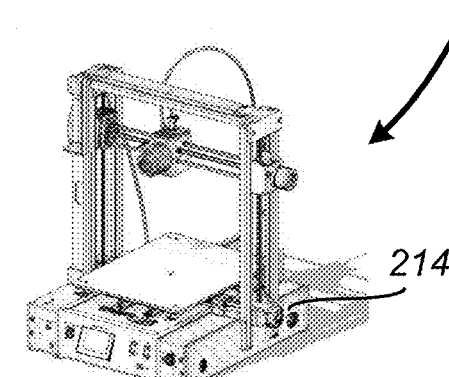
*214*
Additive Manufacturing The Eriched Digital Twin
*Fig. 5*

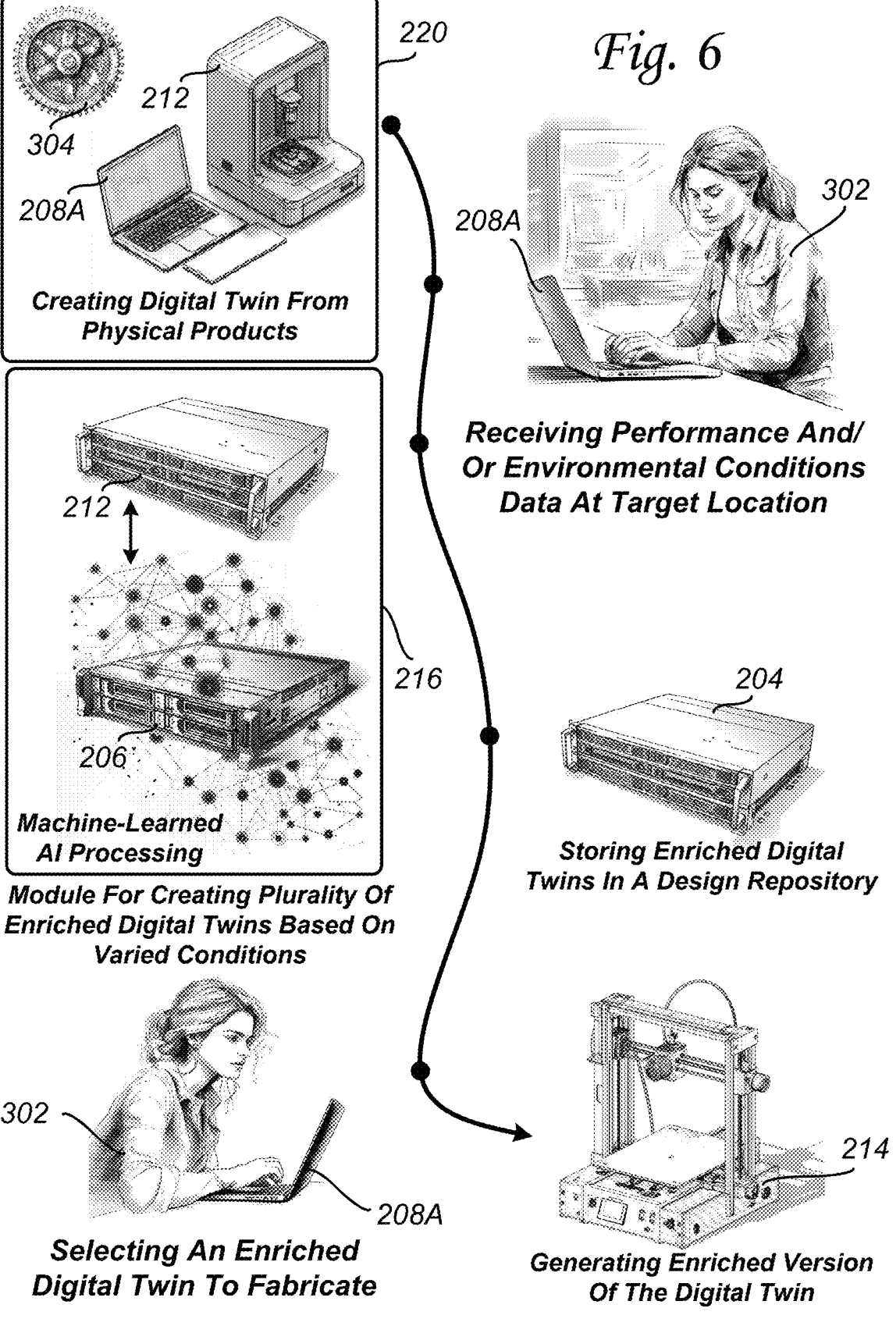

Creating Digital Twin From Physical Products

212
206
216

Machine-Learned AI Processing

Module For Creating Plurality Of Enriched Digital Twins Based On Varied Conditions

302
208A

Selecting An Enriched Digital Twin To Fabricate

208A
302

Receiving Performance And/ Or Environmental Conditions Data At Target Location

204

Storing Enriched Digital Twins In A Design Repository

214

Generating Enriched Version Of The Digital Twin

216

212

Retraining
Database

206

Machine-Learned
AI Processing – Updated
Substitution Decision Logic

230

Feedback

Sensor ID

214

Generating
Enriched Version Of
The Digital Twin At
Deployment Site

220

304

212

208A

Feedback
Collector

Creating Digital Twin From
Physical Products

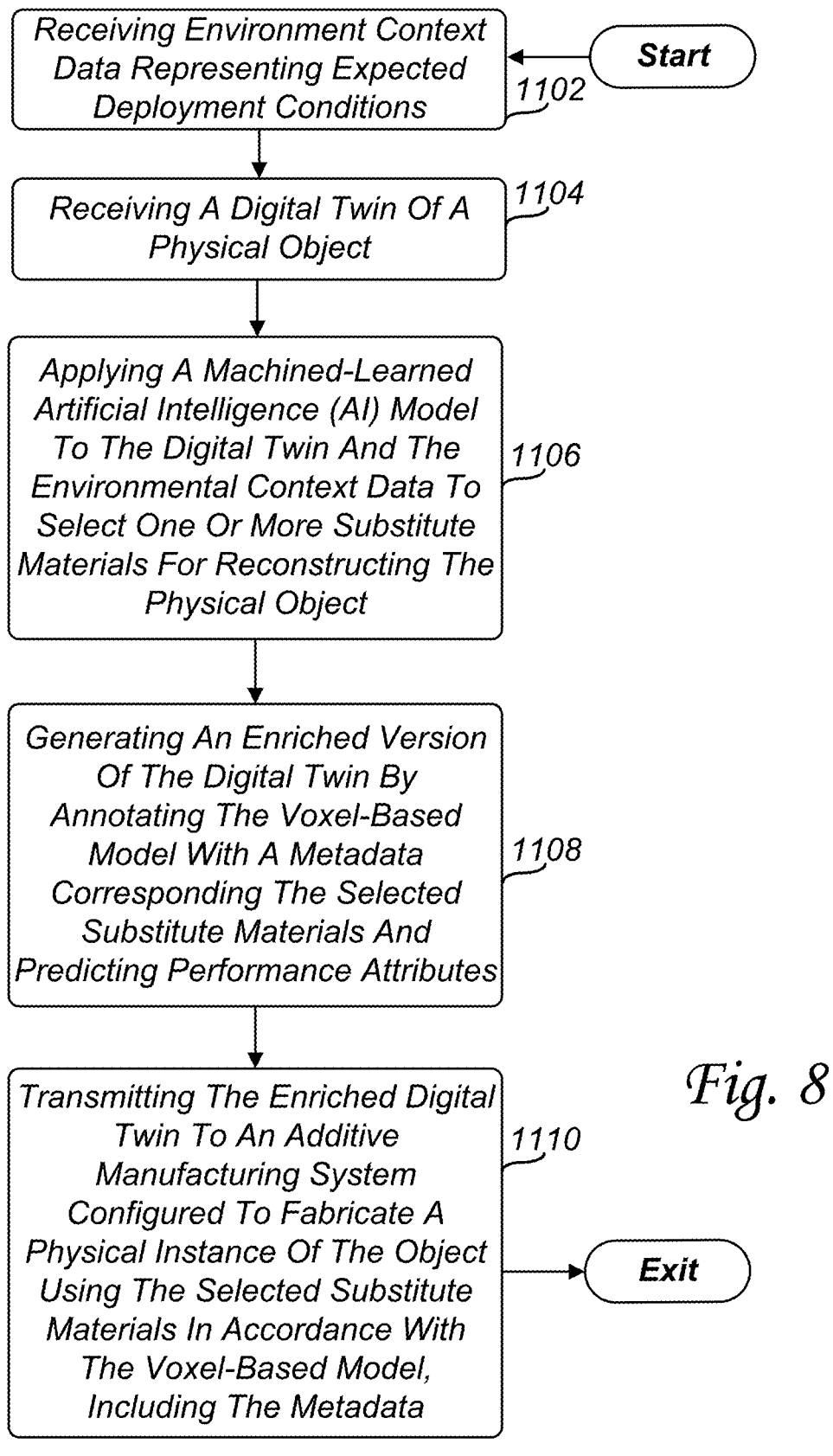

Receiving Environment Context Data Representing Expected Deployment Conditions  1102

Start

Receiving A Digital Twin Of A Physical Object  1104

Applying A Machined-Learned Artificial Intelligence (AI) Model To The Digital Twin And The Environmental Context Data To Select One Or More Substitute Materials For Reconstructing The Physical Object  1106

Generating An Enriched Version Of The Digital Twin By Annotating The Voxel-Based Model With A Metadata Corresponding The Selected Substitute Materials And Predicting Performance Attributes  1108

Transmitting The Enriched Digital Twin To An Additive Manufacturing System Configured To Fabricate A Physical Instance Of The Object Using The Selected Substitute Materials In Accordance With The Voxel-Based Model, Including The Metadata  1110

Exit

Fig. 8

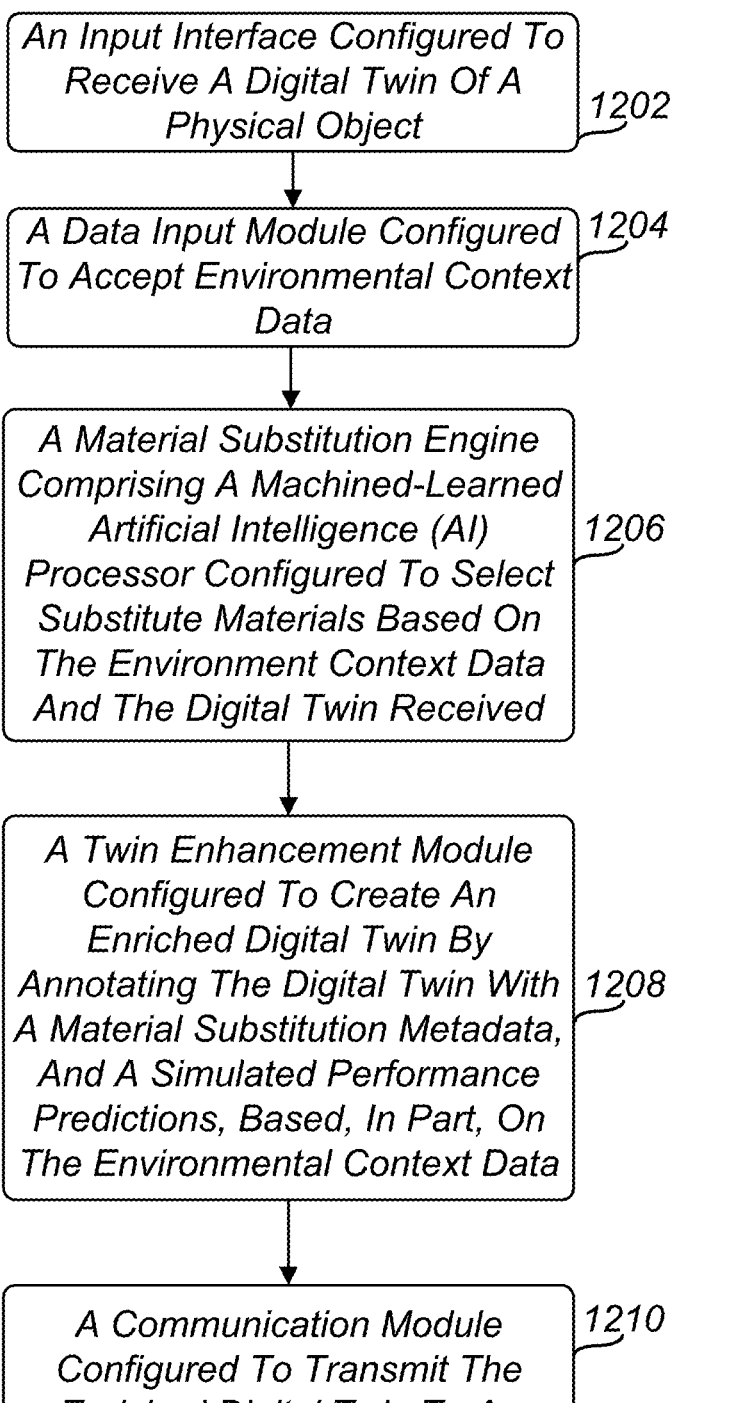

An Input Interface Configured To Receive A Digital Twin Of A Physical Object 1202

A Data Input Module Configured To Accept Environmental Context Data 1204

A Material Substitution Engine Comprising A Machined-Learned Artificial Intelligence (AI) Processor Configured To Select Substitute Materials Based On The Environment Context Data And The Digital Twin Received 1206

A Twin Enhancement Module Configured To Create An Enriched Digital Twin By Annotating The Digital Twin With A Material Substitution Metadata, And A Simulated Performance Predictions, Based, In Part, On The Environmental Context Data 1208

A Communication Module Configured To Transmit The Enriched Digital Twin To An Additive Manufacturing System For Reconstruction Of The Physical Object Using The Selected Materials 1210

Fig. 9

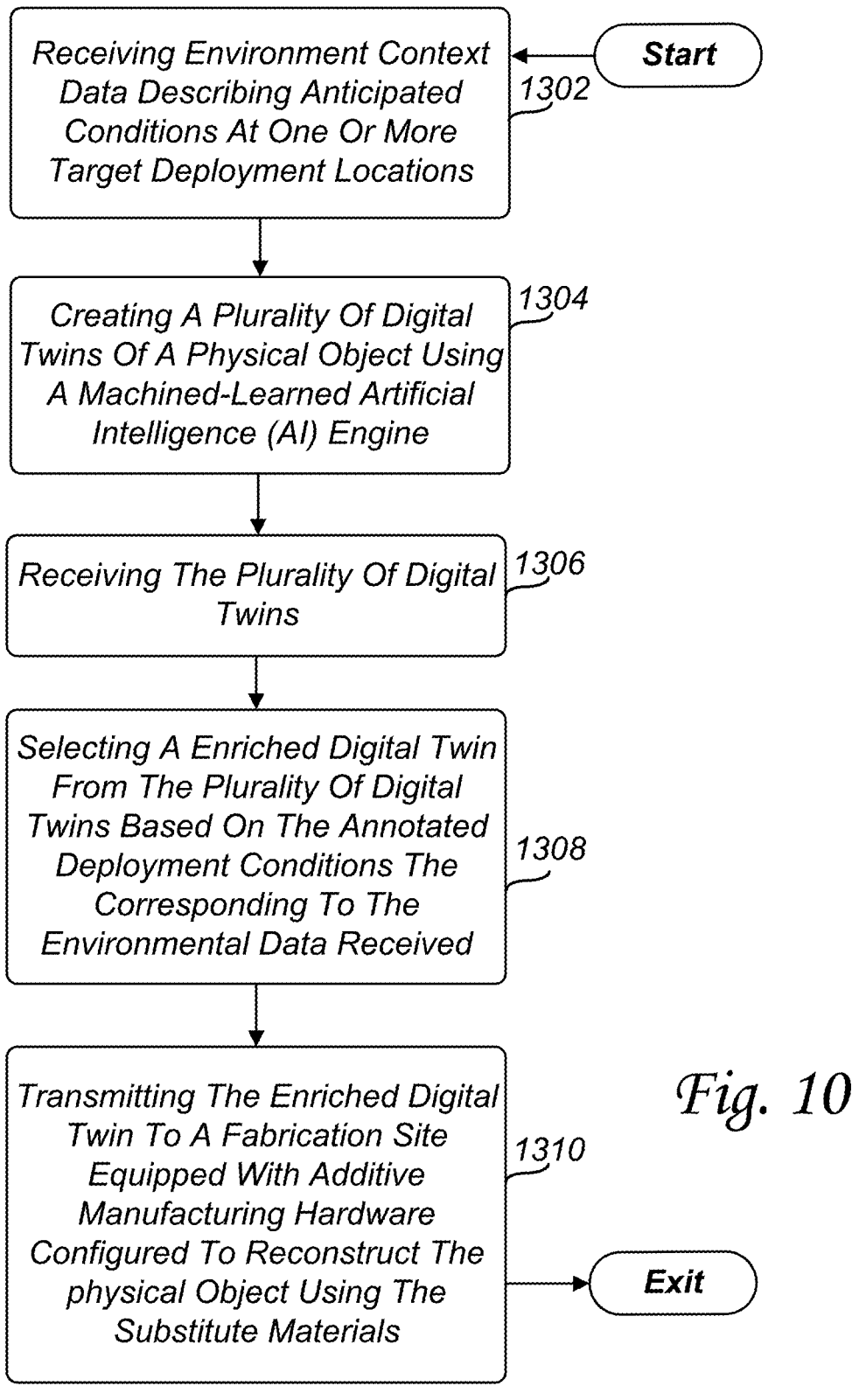

Receiving Environment Context Data Describing Anticipated Conditions At One Or More Target Deployment Locations
*1302*

*Start*

Creating A Plurality Of Digital Twins Of A Physical Object Using A Machined-Learned Artificial Intelligence (AI) Engine
*1304*

Receiving The Plurality Of Digital Twins
*1306*

Selecting A Enriched Digital Twin From The Plurality Of Digital Twins Based On The Annotated Deployment Conditions The Corresponding To The Environmental Data Received
*1308*

Transmitting The Enriched Digital Twin To A Fabrication Site Equipped With Additive Manufacturing Hardware Configured To Reconstruct The physical Object Using The Substitute Materials
*1310*

*Exit*

*Fig. 10*

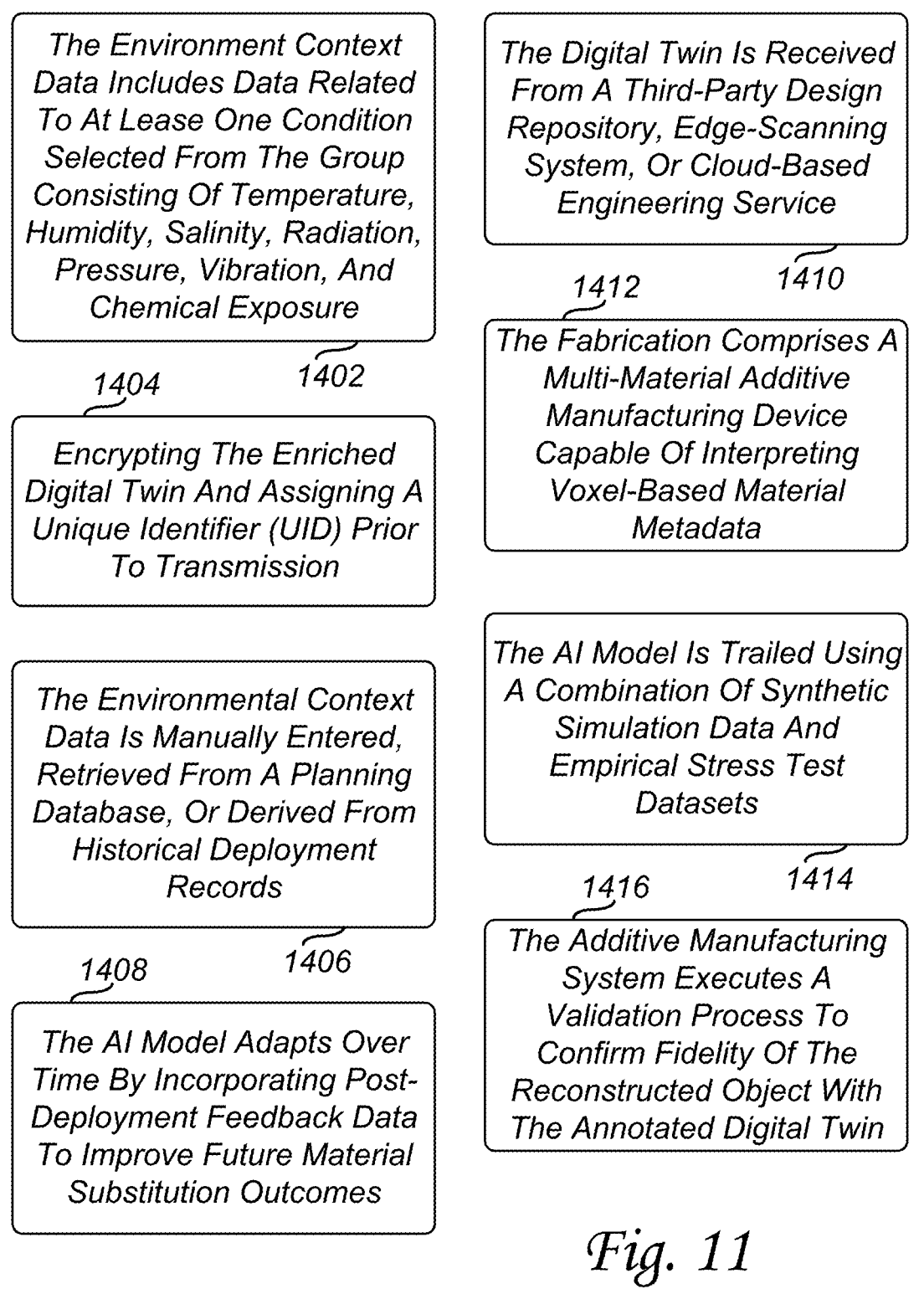

The Environment Context Data Includes Data Related To At Lease One Condition Selected From The Group Consisting Of Temperature, Humidity, Salinity, Radiation, Pressure, Vibration, And Chemical Exposure 1404    1402

Encrypting The Enriched Digital Twin And Assigning A Unique Identifier (UID) Prior To Transmission The Environmental Context Data Is Manually Entered, Retrieved From A Planning Database, Or Derived From Historical Deployment Records 1408    1406

The AI Model Adapts Over Time By Incorporating Post-Deployment Feedback Data To Improve Future Material Substitution Outcomes The Digital Twin Is Received From A Third-Party Design Repository, Edge-Scanning System, Or Cloud-Based Engineering Service 1412    1410

The Fabrication Comprises A Multi-Material Additive Manufacturing Device Capable Of Interpreting Voxel-Based Material Metadata The AI Model Is Trailed Using A Combination Of Synthetic Simulation Data And Empirical Stress Test Datasets 1416    1414

The Additive Manufacturing System Executes A Validation Process To Confirm Fidelity Of The Reconstructed Object With The Annotated Digital Twin

*Fig. 11*

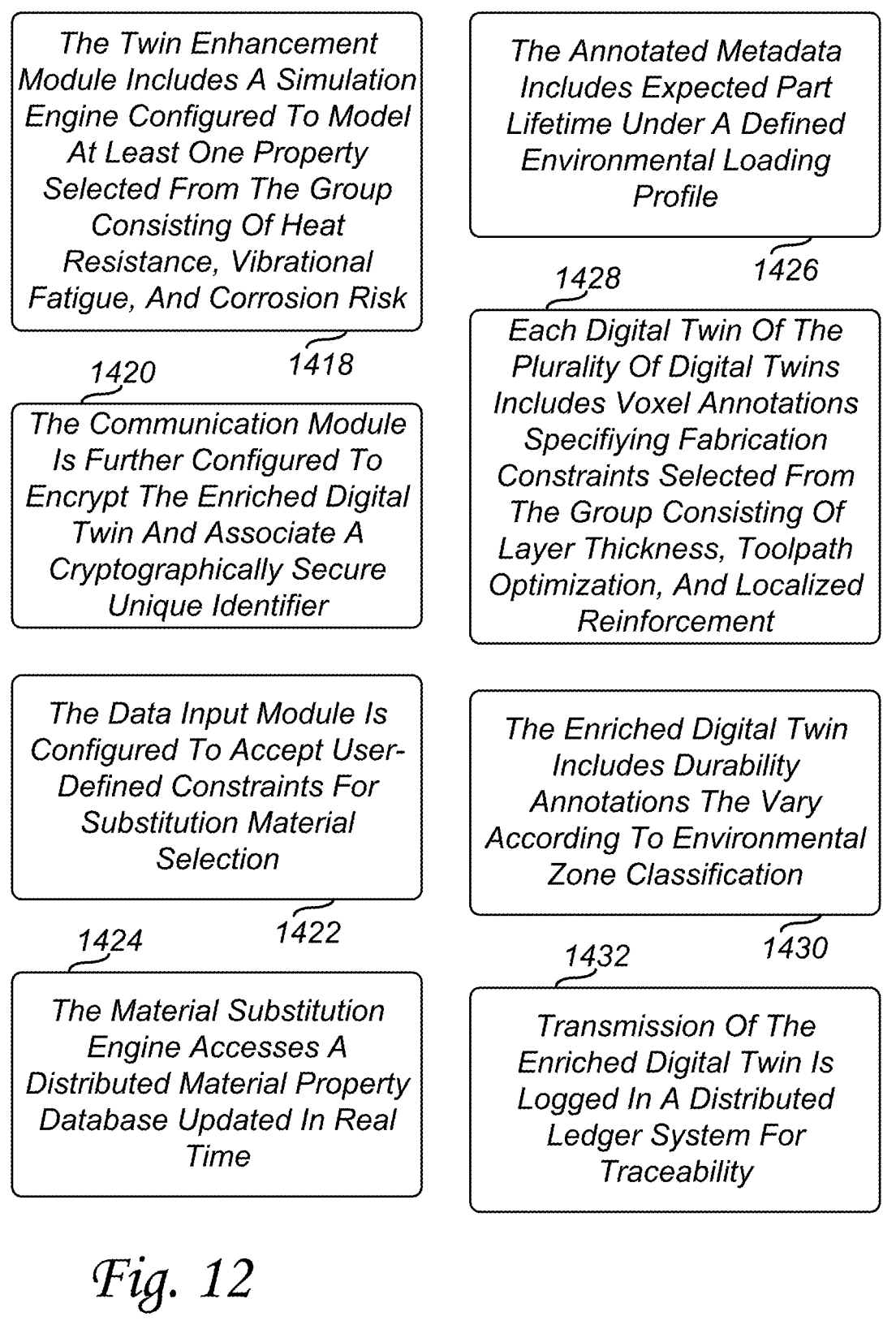

The Twin Enhancement Module Includes A Simulation Engine Configured To Model At Least One Property Selected From The Group Consisting Of Heat Resistance, Vibrational Fatigue, And Corrosion Risk 1420  1418

The Communication Module Is Further Configured To Encrypt The Enriched Digital Twin And Associate A Cryptographically Secure Unique Identifier The Annotated Metadata Includes Expected Part Lifetime Under A Defined Environmental Loading Profile 1428  1426

Each Digital Twin Of The Plurality Of Digital Twins Includes Voxel Annotations Specifiying Fabrication Constraints Selected From The Group Consisting Of Layer Thickness, Toolpath Optimization, And Localized Reinforcement The Data Input Module Is Configured To Accept User-Defined Constraints For Substitution Material Selection 1424  1422

The Material Substitution Engine Accesses A Distributed Material Property Database Updated In Real Time The Enriched Digital Twin Includes Durability Annotations The Vary According To Environmental Zone Classification 1432  1430

Transmission Of The Enriched Digital Twin Is Logged In A Distributed Ledger System For Traceability

*Fig. 12*

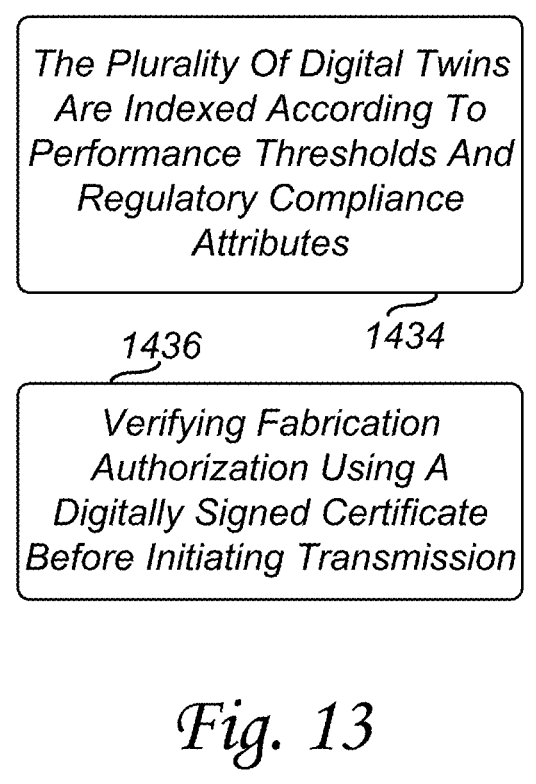

The Plurality Of Digital Twins Are Indexed According To Performance Thresholds And Regulatory Compliance Attributes 1436          1434

Verifying Fabrication Authorization Using A Digitally Signed Certificate Before Initiating Transmission

*Fig. 13*

ADAPTIVE OBJECT FABRICATION USING ENRICHED VOXEL-BASED DIGITAL TWINS AND AI-GUIDED MATERIAL SUBSTITUTION

TECHNICAL FIELD OF THE INVENTION

This invention relates to adaptive digital manufacturing systems, and particularly to methods and systems for generating, enriching, and fabricating physical objects using voxel-based digital twins that are dynamically tailored to environmental deployment conditions. More specifically, the invention concerns the integration of machine-learned artificial intelligence (AI), predictive failure modeling, and voxel-resolved metadata embedding to produce enriched digital twins that guide additive manufacturing processes. These enriched models incorporate material substitution data, environmental stress factors, and fabrication-specific instructions, enabling precise, context-aware replication of objects across distributed manufacturing environments.

BACKGROUND OF THE INVENTION

Before our invention, existing approaches to digital modeling, material selection, and object fabrication were characterized by significant limitations in adaptability, intelligence, and environmental awareness. While computer-aided design (CAD) and digital twin technologies have long supported the creation of virtual replicas, these models were typically static in nature, focused on geometry and appearance rather than contextual functionality. They lacked the capacity to embed meaningful environmental intelligence, which rendered them ill-suited for deployment in varied and demanding real-world conditions.

Previous fabrication workflows often relied on fixed material libraries or manually curated substitution rules that did not account for the specific deployment environment. This resulted in performance mismatches, shortened product lifespans, and increased failure rates in applications such as aerospace, medical devices, and outdoor infrastructure. Materials chosen without reference to environmental stressors-like corrosion from salt fog, fatigue from vibration cycles, or degradation from UV radiation—frequently underperformed, posing risks to safety and reliability.

Moreover, artificial intelligence, when applied at all, operated in isolation from the manufacturing process. These AI systems might recommend substitute materials, but they did not produce fabrication-ready models capable of controlling real-world production systems. The absence of voxel-level integration between AI predictions and physical manufacturing constrained the system's ability to make nuanced, performance-oriented adaptations during fabrication.

Another persistent challenge was the inability to embed localized manufacturing directives—such as variable print speeds, toolpath optimizations, or reinforcement requirements—directly into the digital representation. This created disconnects between design and production, resulting in inefficient, generic fabrication processes and failure to meet precise operational demands.

Security and traceability were also largely missing from prior approaches. Digital models were often shared across unsecured channels, vulnerable to unauthorized access, tampering, or counterfeiting. With no embedded audit trail or cryptographic verification, it was difficult to ensure the authenticity of the design or compliance with regulatory and warranty standards. This left manufacturers and users exposed to legal, safety, and reputational risks.

Finally, most systems were static in their decision-making and could not evolve based on operational feedback. Without the ability to incorporate post-deployment performance data, these systems could not refine future predictions, resulting in a stagnant material selection process and an inability to learn from real-world outcomes.

While systems such as Siemens NX, Autodesk Generative Design, GE Predix, and HP MultiJet Fusion offer generative modeling or data analytics, they do not incorporate voxel-level material annotations combined with predictive AI modeling and environmental adaptability. These prior systems lack localized reinforcement logic at the fabrication stage, omit closed-loop AI retraining, and do not leverage deployment feedback to refine future designs.

The present invention addresses these and other shortcomings by providing a robust, intelligent, and secure system for context-aware, performance-driven digital twin enrichment and adaptive fabrication. For these reasons and shortcomings, as well as other reasons and shortcomings, there is a long-felt need that gives rise to the present invention.

SUMMARY OF THE INVENTION

The shortcomings of the prior art are overcome, and additional advantages are provided through the provision of an adaptive object fabrication method that utilizes enriched digital twin technology to generate performance-aware, fabrication-ready data structures. In an exemplary embodiment, the method begins by receiving environmental context data representative of real—world deployment conditions—such as temperature, vibration, humidity, or chemical exposure— expected at the physical location where the object will be used. A digital twin of the object, comprising a voxel-based geometric model, is then received and used as the foundational structure. A machine-learned artificial intelligence (AI) model is applied to the digital twin in combination with the environmental context data to intelligently select substitute materials tailored to operational needs. The AI model is trained to forecast failure modes and performance degradation under various stress conditions, enabling predictive substitution decisions. The digital twin is then enhanced by annotating it with voxel-level metadata that reflects the selected materials and anticipated performance characteristics. Finally, the enriched digital twin is securely transmitted to an additive manufacturing system capable of reconstructing the object with localized adaptation based on the embedded metadata. This approach provides a closed-loop, intelligent fabrication process that dynamically links digital modeling, material intelligence, and physical production in a functionally integrated and environmentally responsive manner.

Additional shortcomings of the prior art are overcome, and additional advantages are provided through the provision of an adaptive object fabrication system designed to intelligently bridge digital modeling with environmentally responsive, metadata-driven manufacturing. In an exemplary embodiment, the system includes an input interface configured to receive a digital twin of a physical object, wherein the digital twin comprises a voxel-based model encoding the object's geometric structure in volumetric detail. A data input module accepts environmental context data representing the anticipated deployment conditions, such as thermal stress, chemical exposure, vibration, and pressure, associated with the physical object's intended use environment. A material substitution engine, including a machine-learned artificial intelligence (AI) processor, analyzes the digital twin in light of the environmental data and selects substitute materials optimized for durability and performance, based on predictive failure models trained on empirical and simulated degradation datasets. A twin enhancement module then creates an enriched digital twin by annotating the voxel-based model with material substitution metadata and performance simulation results tailored to deployment-specific requirements. Finally, a communication module securely transmits the enriched digital twin to an additive manufacturing system configured to reconstruct the physical object using the selected materials, thereby enabling context-aware, precision fabrication. This system delivers a technically unified framework that dynamically adapts design and manufacturing workflows in response to real-world deployment scenarios, unlocking a new class of responsive and intelligent fabrication capabilities.

Additional shortcomings of the prior art are overcome, and additional advantages are provided through the provision of an adaptive object fabrication method that enables intelligent selection and deployment of environment-specific digital twin variants. In an exemplary embodiment, the method begins by receiving environmental performance data representing the anticipated deployment conditions— such as temperature fluctuations, chemical exposure, vibration stress, or corrosive environments—associated with one or more physical locations. A machine-learned artificial intelligence (AI) engine, trained on predictive failure modes and material durability profiles, generates a plurality of enriched digital twins of a physical object. Each enriched digital twin comprises a voxel-based model annotated with substitute material metadata and simulated performance forecasts, customized to match a distinct set of deployment conditions. This plurality of enriched models is received and evaluated, and a context-appropriate enriched digital twin is selected based on correspondence with the deployment environment data. The selected enriched digital twin is then transmitted to a fabrication site equipped with additive manufacturing hardware configured to reconstruct the object using the specified substitute materials and embedded fabrication instructions. This adaptive methodology provides a scalable, context-sensitive manufacturing process that moves beyond static design files, offering tailored performance, reduced failure risk, and improved field reliability for mission-specific applications.

Unlike existing manufacturing platforms, the present invention uses AI-trained models to optimize substitute materials tailored to deployment environments, annotates the digital twin at the voxel level with metadata such as predicted degradation risk, and enables retraining of the AI model through performance feedback—a capability not disclosed or supported in Siemens NX, Autodesk Fusion 360, or GE Predix frameworks.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE FIGURES

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 2 illustrates one example of an enriched voxel metadata structure diagram;

FIG. 3 illustrates one example of an artificial intelligence (AI) driven material substitution and digital twin enrichment process;

FIG. 5 illustrates one example of a use case for producing, storing, enriching, and additive manufacturing of at least one of the enriched digital twin;

FIG. 6 illustrates one example of a use case for producing, enriching a plurality of enriched digital twins, storing, selecting, and additive manufacturing of at least one of the enriched digital twin;

FIG. 8 illustrates one example of a method of adaptive object fabrication;

FIG. 9 illustrates one example of a system of adaptive object fabrication;

FIG. 10 illustrates one example of a method of adaptive object fabrication;

FIGS. 11-13 illustrates exemplary embodiments that can be used interchangeably with the methods of the present invention.

Figure 1:
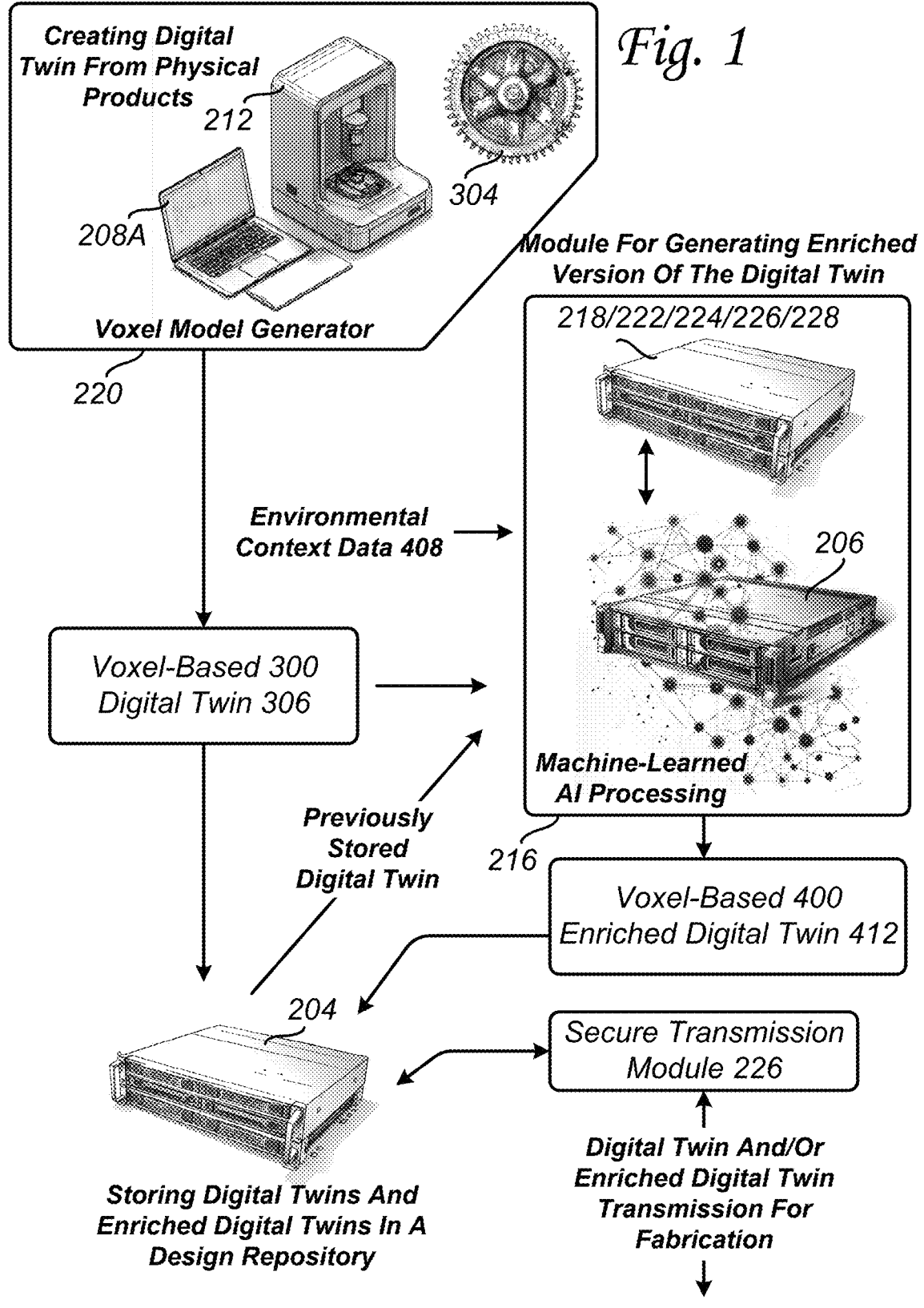
FIG. 1 illustrates one example of an adaptive object fabrication system and network configuration for creating and storing voxel-based digital twins and enriched digital twins.

The detailed description explains the preferred embodiments of the invention, together with advantages and features, by way of example, with reference to the drawings.

DETAILED DESCRIPTION OF THE INVENTION

The present invention relates to adaptive object replication systems and methods, and more specifically to the intelligent enhancement and fabrication of digital twin models using machine-learned artificial intelligence (AI) to select substitute materials based on predicted performance under anticipated environmental deployment conditions.

In many manufacturing and engineering applications, there is a growing need to replicate physical objects in a manner that ensures both geometric accuracy and long-term functional reliability. While advances in 3D scanning, modeling, and additive manufacturing have enabled high-fidelity reproduction of object geometry, these tools typically fail to account for the environmental stresses and usage scenarios in which the replicated object must operate. As a result, replicated parts may degrade prematurely or fail under real-world operating conditions, particularly when exposed to variables such as temperature fluctuations, humidity, salinity, chemical exposure, radiation, pressure, or vibration.

Conventional systems that rely solely on geometric modeling often overlook material selection as a contextual and performance-sensitive decision. Material substitutions, when made at all, are generally performed manually or using static look-up tables that do not account for specific environmental deployment factors. Moreover, traditional digital twins lack embedded intelligence, offering little to no predictive insight into how a given material configuration will perform in the field. This disconnect between design assumptions and operational reality poses significant challenges to the safety, efficiency, and durability of replicated objects.

The present invention overcomes these limitations through an end-to-end solution that integrates AI-based material substitution into the digital twin modeling and fabrication pipeline. At the core of the invention is a machine-learned AI model trained on empirical degradation data, environmental exposure profiles, and material performance histories. This model is applied to a voxel-based digital twin of a physical object, using environmental context data representing expected deployment conditions as a basis for intelligent material substitution. The result is an enriched digital twin annotated with metadata that reflects both structural geometry and material-specific performance predictions.

Importantly, the enriched digital twin is configured for direct use by an additive manufacturing system. The metadata embedded at the voxel level informs fabrication decisions such as toolpath optimization, layer thickness, reinforcement zones, and thermal tolerances. As such, the output of the system is not simply a replicated shape, but a context-aware physical object optimized for deployment in its target environment.

The invention further supports secure transmission and traceable fabrication through the assignment of unique identifiers (UIDs), encryption of digital assets, and optional logging into distributed ledgers for auditability. This ensures that digitally transmitted fabrication instructions maintain integrity and authenticity throughout the production lifecycle, even in distributed or remote manufacturing settings.

In addition to enabling responsive fabrication for known environmental conditions, the invention supports forward adaptability through continual model refinement. Post-deployment performance data can be used to retrain the AI model, thereby improving the accuracy of future material substitution and enhancing the long-term resilience of the system.

Taken together, the present invention introduces a paradigm shift in digital object replication. It moves beyond static geometric modeling to a more intelligent, performance-aware, and environmentally adaptive approach. By embedding contextual reasoning and predictive substitution into the replication process, the invention facilitates the creation of digital twins that are not only accurate but also reliable, durable, and optimized for the conditions in which they will operate. This advancement has broad applicability across industries, including aerospace, automotive, energy, consumer products, healthcare, and field-deployable infrastructure, where high-performance replication under varied environmental conditions is critical.

In the present invention, the term "voxel" is intended to mean a volumetric pixel, representing a discrete unit of 3D space within a voxel-based model, capable of encoding spatial geometry along with associated metadata including material, environmental, and fabrication-specific information.

In the present invention, the term "voxel-based model" is intended to mean a three-dimensional digital representation of a physical object, wherein the geometry is divided into discrete volumetric units (voxels), each of which can store geometric, material, or metadata attributes for fabrication or analysis purposes.

In the present invention, the term "voxel metadata" is intended to mean embedded data fields associated with individual voxels within a voxel-based model, including but not limited to material identifiers, predicted performance metrics, environmental classifications, fabrication parameters, and simulation-derived annotations.

In the present invention, the term "voxel annotation" is intended to mean embedded metadata associated with individual voxels within a digital twin, specifying material properties, performance predictions, fabrication instructions, or durability profiles.

In the present invention, the term "digital twin" is intended to mean a data-driven digital representation of a physical object or system, constructed using sensor inputs, scans, or other data acquisition methods, and configured to enable simulation, analysis, and replication of the real-world object's behavior, structure, and properties.

In the present invention, the term "enriched digital twin" is intended to mean a voxel-based digital model of a physical object that has been annotated with additional metadata, including material substitution data, environmental context, predicted performance attributes, and manufacturing constraints, such that the model can serve as a directive for adaptive fabrication.

In the present invention, the term "environmental context data" is intended to mean data describing anticipated real-world conditions (e.g., temperature, pressure, vibration, humidity, salinity, or chemical exposure) associated with the target deployment environment of a fabricated object.

In the present invention, the term "material substitution engine" is intended to mean a software and/or hardware module comprising at least one machine-learned artificial intelligence (AI) processor configured to select one or more substitute materials for fabrication based on environmental context data, performance simulations, and material property databases.

In the present invention, the term "twin enhancement module" is intended to mean a data processing component that generates an enriched digital twin by applying AI-driven material selections, simulation predictions, and manufacturing constraints as metadata annotations to a voxel-based model.

In the present invention, the term "secure transmission module" is intended to mean a hardware and/or software system configured to encrypt and transmit enriched digital twins to authorized additive manufacturing endpoints, while preserving integrity, authenticity, and traceability using secure hash, cryptographic identifiers, or distributed ledger logging.

In the present invention, the term "adaptive object fabrication" is intended to mean the process of creating physical objects using enriched digital twins that are dynamically modified based on environmental deployment data, simulation analysis, and AI-selected substitute materials to meet performance and compliance objectives under varying conditions.

In the present invention, the term "additive manufacturing system" is intended to mean any physical fabrication apparatus—such as a 3D printer—capable of receiving and interpreting enriched digital twins to construct physical objects layer-by-layer, optionally using multiple materials and fabrication constraints specified on a per-voxel basis.

In the present invention, the term "distributed material property database" is intended to mean a network-synchronized repository of material data, accessible by the material substitution engine, that includes performance characteristics, supplier availability, compliance certifications, and experimental results used in AI-driven material decision-making.

In the present invention, the term "distributed ledger" is intended to mean a decentralized database, such as a blockchain, used to immutably record events, transactions, or object transfers within the adaptive object fabrication system, enabling traceability, auditability, and anti-counterfeiting measures.

In the present invention, the term "deployment condition" is intended to mean the environmental, physical, or functional context in which a fabricated object is intended to operate, which influences the enrichment, material selection, and fabrication strategy of its corresponding digital twin.

Turning now to the drawings in greater detail, it will be seen that in FIG. 1, there is illustrated one example of an adaptive object fabrication system and network configuration for creating and storing voxel-based 300 digital twins 306 and voxel-based 400 enriched digital twins 412 in a distributed architecture optimized for performance-based material substitution and contextual fabrication.

In an exemplary embodiment, the system includes a voxel model generator 220, which operates by ingesting input from a 3D scanning engine or sensor-rich edge capture device 212, design repository 204, and other suitable devices and methods to generate a voxel-based 300 digital twin 306. Each voxel-based 300 digital twin 306 in the model encodes spatial occupancy, geometric shape, and local boundary conditions. These voxel units are organized in a 3D matrix or tree-based spatial index (e.g., octree) to enable fast traversal and localized data embedding. This enables the digital twin 306 to not only describe shape but also spatially register information such as anisotropic tolerances or fabrication constraints.

Alongside geometry acquisition, environmental context data 408 is collected through a secure input pipeline. This data includes both static deployment conditions and dynamic parameters likely to affect material performance, such as vibration spectrum over time, salt fog exposure cycles, thermal cycling curves, and other material performance factors. In some embodiments, the environmental context data 408 can be streamed from Internet of Things (IoT) sensors co-located with the intended deployment site, accessed from a remote database indexed by geographic tag, manually entered by an operator via a user interface, or other provided by other suitable methods.

The module for generating enriched digital twins 216, which comprises operationally related data processing resources 212, machine-learned AI processing resources 206, and other necessary resources and devices, acts as the core decision-making component, trained on historical degradation datasets, simulation results, and prior field reports of material failure. It uses machine-learned models such as random forests, graph neural networks, or ensemble regression to match deployment contexts to materials with favorable survival probabilities. The model operates not merely as a selector, but as a contextual inference engine—evaluating tradeoffs in mechanical strength, corrosion resistance, manufacturability, cost, and thermal stability. The AI does not only suggest substitutes—it simulates their expected failure pathways under the given conditions.

To validate the AI recommendations, a performance simulation module 222 runs scenario-driven evaluations such as finite element analysis (FEA), virtual stress testing, computing predicted lifespans or failure points, and other simulations. The simulation output can be transformed into structured data blocks that are mapped back into the voxel space 300 of the digital twin 306.

As better illustrated in FIG. 2, a metadata enrichment module 224 then produces the enriched digital twin 400, embedding material substitution metadata 402, simulation metadata 410, including performance predictions and environmental tagging metadata 404, other parameters metadata 406, and other metadata directly within the enriched voxel 400 structure. The metadata schema includes fields such as 'material_id', 'predicted_lifetime_hours', 'max_operating_temp_C', 'fatigue_cycles_to_failure', 'nozzle_temperature', 'reinforcement_strategy_code', 'environmental_zone_classification' (e.g., polar_tundra, desert, subsea), and numerous other customizable fields, as may be required and/or desired in a particular embodiment. This allows the voxel-level granularity to reflect localized substitution, reinforcing only those regions predicted to experience stress, and tailoring material blends accordingly.

The enriched digital twin 412 is then processed by a secure transmission module 226, which assigns a cryptographically signed unique identifier (UID) 410, encrypts the model if necessary, and transmits it to remote endpoints. To ensure non-repudiation, the system may log the transaction to a blockchain ledger, creating traceability and anti-tamper assurance.

Unlike generic networks where digital files are simply uploaded or downloaded, the present system is purpose-built for the adaptive replication of physical objects 304. The network fabric is enriched with object-aware routing and policy layers, allowing only authorized additive manufacturing systems 214 to retrieve and act on the enriched digital twin 412. These systems interpret the voxel metadata to dynamically adapt toolpaths, print speeds, extrusion temperatures, and reinforcement parameters on a per-region basis, enabling fabrication outcomes aligned with predicted environmental stressors.

The digital twin repository 204 functions not just as passive storage, but as an active version-managed and compliance-indexed registry. It can track each enriched twin's lineage, material justification, environmental assumptions, and simulation history, forming a digital audit trail supporting product safety, regulatory reporting, or field servicing.

Real-World Practical Applications

The adaptive object fabrication system of the present invention finds utility in a range of use cases, for example and not a limitation, such as:

Aerospace components that are subject to rapid temperature cycling and vibrational fatigue;

Underwater robotics, where salinity and pressure dictate material longevity;

Medical implants that must tolerate body chemistry variability;

Outdoor industrial enclosures needing UV- and chemical-resistant materials tailored to regional environmental codes;

Remote supply parts fabricated in the field with locally available or certifiably compatible materials; and Numerous other use cases.

These use cases demonstrate the real-world value of integrating context-aware AI into the material selection and enrichment process, closing the loop from digital sensing to physical manufacturing.

The disclosed system offers significantly more than conventional, 'applying AI to CAD' data methods. The present invention's AI engine is structurally interwoven with material property simulation, and the output is used to directly alter how physical objects 304 are constructed in the real world. The enriched digital twin 412 is not merely data—it serves as a manufacturing directive that modifies additive fabrication behavior.

The present invention is thus rooted in technology and yields a tangible transformation of matter. Each enriched digital twin 412 carries manufacturing instructions materially different from the original model, reflecting not abstract ideas, but applied engineering under variable deployment contexts.

Additionally, the system's ability to generate different outcomes for the same geometry based on real-world environmental variation reinforces its non-abstract, application-specific character.

Referring to FIG. 2, there is illustrated one example of an enriched voxel metadata structure diagram 400 showing how voxel-level data within a digital twin can be extended to support contextual, material, and environmental awareness for adaptive object fabrication.

In an exemplary embodiment, each enriched voxel 400 within the voxel-based enriched digital twin 412 can be structured to encode not only geometric and spatial occupancy data, but also a set of embedded metadata fields that guide fabrication under real-world constraints. The voxel structure can be implemented as a sparse matrix or octree-based data block, with each voxel addressable by its X, Y, Z location and uniquely identified by a voxel index or coordinate hash.

A material substitution metadata field 402 can be associated with each voxel, containing identifiers (e.g., material_id) referencing selected or substituted material profiles from a materials database 228. This data can include tensile strength, corrosion resistance rating, thermal deformation thresholds, or other relevant performance indicators selected by the AI material substitution engine, which is part of the module 216 for generating an enriched version of a digital twin. In certain implementations, this field supports composite or hybrid material assignments, permitting multi-material deposition within a single part.

Simulation metadata 410 can be used to embed simulation-derived attributes such as predicted_lifetime_hours, fatigue_cycles_to_failure, max_operating_temp_C, or similar. These predictions are generated via the simulation engine 222 during enrichment and are tailored to the environmental context data 408 for the intended deployment scenario. Each voxel, therefore, becomes an atomic unit of not only geometry but function, able to express localized durability forecasts.

Environmental tagging metadata 404 can be used to enable the system to record associations between voxel regions and environmental stress classifications. These tags can be assigned based on structural exposure regions (e.g., outer housing vs. internal bracket), dynamic forces (e.g., vibration zones), and other structural exposure. Examples include env_zone: coastal_salt_fog, env_zone: high_temp_internal, env_zone: low pressure_cabin, and others.

The manufacturing instruction/fabrication constraints metadata 414 encodes fabrication-specific directives, such as layer height, print speed, nozzle temperature, infill density, path optimization flags, and others. These values can be derived from the metadata enrichment module 224, or other suitable modules based on the selected materials and structural requirements, and are interpretable by voxel-aware additive manufacturing systems 214 to dynamically adapt toolpaths and print parameters.

The enriched voxel 400 may also include an other parameter extension field 406 to accommodate future metadata categories or custom tags. This design flexibility enables integration with other manufacturing ecosystems or domain-specific parameters such as RFID tagging, lifecycle certification codes, anti-counterfeiting hashes, regulatory compliance annotations, and for other purposes.

Unlike traditional CAD models or surface meshes, which capture only geometry, the present enriched voxel data structure supports multi-dimensional, context-aware manufacturing logic. It transforms each voxel into a self-contained unit of fabrication intelligence, ensuring that the object reconstructed from the enriched digital twin 412 is optimized not just for form, but also for performance, survivability, and regulatory compatibility.

This architecture is particularly advantageous in domains requiring high reliability and compliance traceability, such as aerospace, medical implants, off-grid manufacturing, and field-fabricated replacement parts, where environmental resilience is critical. For instance, two instances of the same part geometry may receive different enriched voxel metadata structures depending on whether the part is to be deployed in an arid desert, polar tundra, or corrosive subsea setting.

The voxel-embedded metadata strategy of the present invention results in a materially meaningful data structure that exerts direct control over the physical fabrication process. Unlike traditional design files that simply define shape or appearance, each enriched voxel contains prescriptive fabrication directives that inform how, with what, and under what conditions a region of a part should be manufactured. These directives can influence additive manufacturing behavior at a granular level, such as dynamically adjusting deposition temperature, infill pattern, reinforcement strategy, or even pausing fabrication to allow material curing or changeover. Because the metadata is embedded per voxel, it allows for localized adaptation, ensuring that different regions of the same object may be fabricated differently in response to their structural roles or expected environmental exposure. This tightly coupled digital-to-physical mapping gives the enriched digital twin a functional role beyond representation: it becomes an operational blueprint that directly orchestrates how the object is constructed in space, time, and material composition. In this way, the enriched voxel structure serves not just as a model, but as a machine-executable directive with real-world engineering consequences.

In operation, the enriched voxel metadata structure 400 transforms the digital twin 306 from a static representation into an enriched digital twin 410—an environment-aware, fabrication-ready directive that tightly integrates AI-driven analysis, contextual data, and additive manufacturing execution in a manner that is structurally and functionally distinct.

Referring to FIG. 3, there is illustrated one example of an artificial intelligence (AI) driven material substitution and digital twin enrichment process in the form of a flowchart diagram. FIG. 3 represents an exemplary method for transforming a conventional digital twin 306 into a fabrication-ready enriched digital twin 412 using AI-driven environmental analysis, contextual material inference, simulation validation, and voxel-level metadata enrichment. The process enables per-voxel decision-making that reflects real-world deployment demands and delivers operational manufacturing directives directly embedded in the enriched digital twin 412. The method begins in step 1002.

In step 1002, a voxel-based 300 digital twin 306 model is initially acquired or generated. This model may originate from a 3D scanning engine, edge-capture imaging sensor, or design repository 204, and is structured as a high-resolution voxel grid. Each voxel of the digital twin 306 encodes geometric occupancy and spatial position data, organized using sparse matrix or octree spatial indices. Unlike polygonal CAD meshes, voxel representations enable per-location augmentation with metadata, making the model ideally suited for performance-specific adaptations. The method then moves to step 1004.

In step 1004, environmental context data 408 is introduced. This data describes deployment-specific parameters such as temperature, pressure, chemical exposure, vibration frequency, mechanical loads, and other parameters expected at the target operating site. This information can be sourced from IoT sensors placed in the field, remote environmental databases, or user-defined design specifications. For example, in a maritime application, sensors may report exposure to salt fog, varying pressure depths, and wave-induced vibration. The environmental context data 408 serves as a stress profile that drives the downstream material inference and enrichment process. The method then moves to step 1006.

In step 1006, a machine-learned AI model 206, trained on historical degradation data, field-reported failure events, and synthetic simulations, evaluates the digital twin 306 alongside the environmental context data 408. The model can utilize deep learning architectures such as graph neural networks, ensemble decision trees, or probabilistic inference frameworks to determine potential points of material failure and propose region-specific substitutes. For example, in an aerospace use case, if the context data includes high vibrational stress and large thermal gradients, the AI model may recommend replacing base thermoplastics with high-performance carbon composites in regions expected to flex under thermal cycling. The method then moves to step 1008.

In step 1008, the output of the AI model consists of a set of selected substitute materials tailored to the stressors identified in the environmental context. The material list includes both primary and secondary options, and may specify hybrid compositions for multi-material print compatibility. Each substitute material profile includes attributes like yield strength, elongation at break, corrosion resistance index, and cost-performance tradeoffs. These profiles are matched to specific voxel regions within the digital twin 306. The method then moves to step 1010 until complete then moves to step 1012.

In step 1010, the performance simulation module 222 simulates mechanical behavior and long-term durability for each substitute material within the context of the target geometry. This includes finite element analysis (FEA), fatigue testing, thermal diffusion modeling, and vibrational stress analysis. The simulation outputs parameters such as predicted_lifetime_hours, fatigue_cycles, max_temp_resistance_C, and other parameters, which are later embedded within the voxel metadata 400.

In step 1012, the metadata enrichment module 224 annotates each voxel within the model to generate an enriched digital twin 412. Metadata types include:

Material substitution metadata 402—Identifies the selected material for each voxel region;

Simulation metadata 410—Includes durability and performance attributes;

Environmental tagging metadata 404—Assigns zone-specific environmental classifications;

Manufacturing instructions metadata 414—Guides additive manufacturing parameters, including infill patterns, nozzle temperature, and reinforcement strategies; and Other parameter metadata 406—Provides future extensibility for regulatory tags, anti-counterfeiting hashes, or field servicing codes.

The method then moves to step 1014, where the enriched voxel metadata structure 400 elevates the digital twin 306 into a fully context-aware, fabrication-ready enriched digital twin 412. The metadata is not merely informative—it is prescriptive. Each enriched voxel dictates how that region is to be manufactured, ensuring that fabrication systems dynamically adapt toolpaths, layer strategies, and material deposition techniques in real time based on localized stress profiles. The method then moves to step 1016.

In step 1016, the enriched digital twin 412 can be passed to a secure transmission module 226. This module assigns a cryptographically signed UID and optionally encrypts the file prior to network transmission. To prevent unauthorized reproduction, the system may employ a distributed ledger or blockchain interface for traceable logging and fabrication access control.

From step 1016, the enriched digital twin 412 can be delivered to one or more authorized additive manufacturing systems 214 capable of interpreting voxel-level metadata. These fabrication systems may utilize multi-material printheads and variable-resolution deposition systems to construct parts regionally optimized for durability and deployment. For example, and not a limitation, in an oilfield application, a pressure-sensitive valve housing may be constructed with high-performance polymer in internal fluid-contact regions while using lower-cost materials for external casing-all driven by embedded voxel directives.

In operation, the method illustrated in FIG. 3 demonstrates how the present invention uniquely integrates artificial intelligence with voxel-level digital modeling, environmental awareness, and fabrication control to produce enriched digital twins 412 that function as executable manufacturing directives. Unlike traditional systems that treat fabrication and CAD design as disjointed processes, the present invention tightly fuses AI inference, performance simulation, and voxel metadata enrichment into a unified pipeline. The result is not merely a printable model, but a fabrication-ready, context-specific instruction set that directly governs how each region of a part is physically constructed. This architecture ensures that manufactured parts are not only geometrically accurate but also engineered for durability, functional performance, and regulatory compliance in the specific environments in which they will be deployed.

Figure 4:
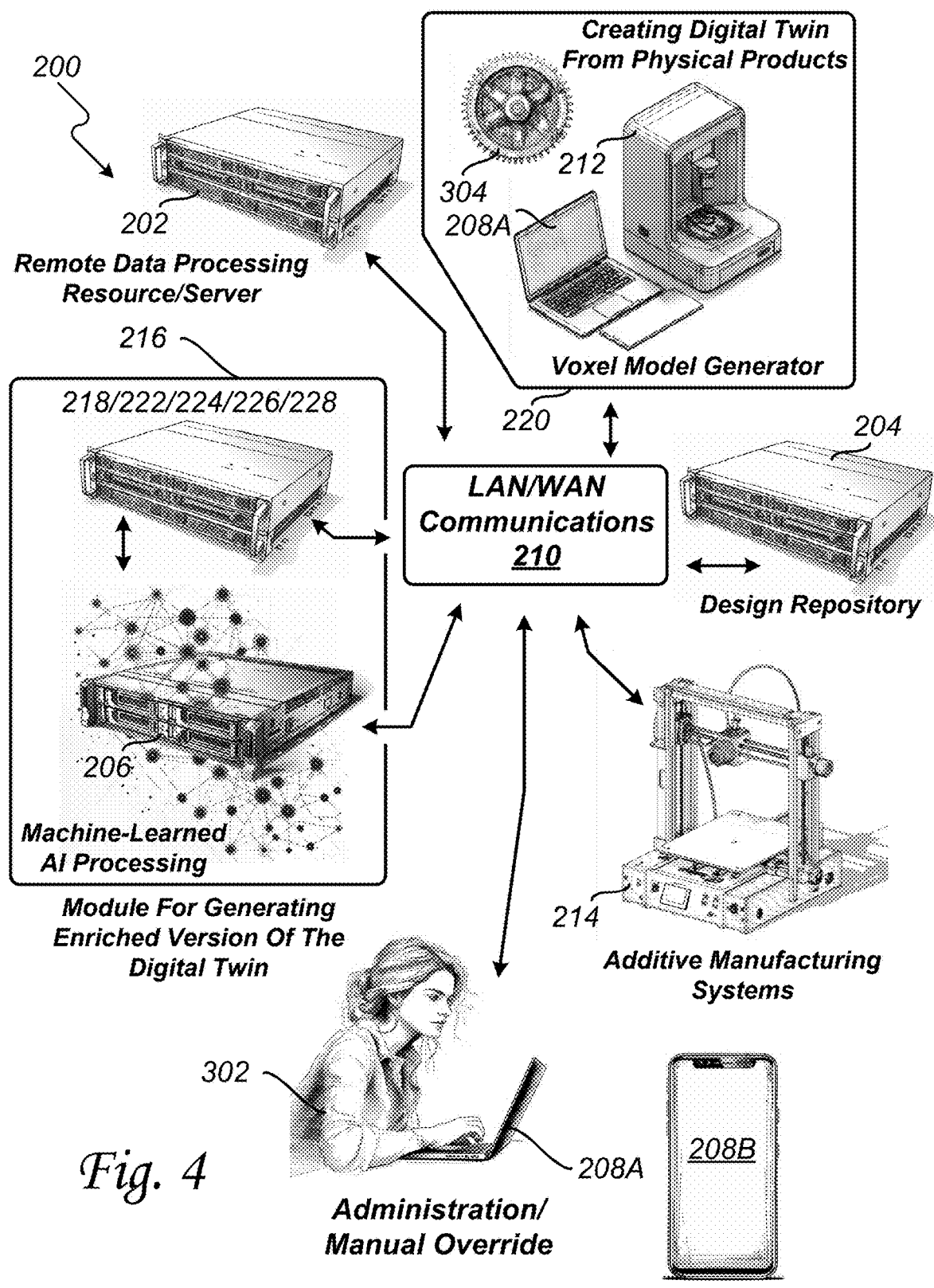
FIG. 4 illustrates one example of an adaptive object fabrication system and network configuration.

Referring to FIG. 4, there is illustrated one example of an adaptive object fabrication system and network configuration 200, which supports intelligent generation, enrichment, transmission, and fabrication of voxel-based digital twins 306 and enriched digital twins 412 over both local and wide area network environments. Unlike generic file-sharing or disconnected manufacturing systems, the present invention operates through a distributed, multi-role architecture of purpose-built modules that collaboratively optimize the fabrication of context-aware physical objects 304.

In an exemplary embodiment, the voxel model generator 220 comprises a three-dimensional (3D) scanning engine 212 and one or more suitable computing devices 208. The computing device 208 can include, without limitation, a desktop or laptop computer (referenced as 208A), or a mobile device such as a tablet or smartphone (referenced as 208B). For ease of reference throughout this disclosure, the computing device may be interchangeably referred to as 208, 208A, or 208B.

The computing device 208A in the voxel model generator 220 can be configured to acquire and process the geometry and surface characteristics of a physical object 304. Using volumetric imaging techniques, the system generates a voxel-based digital twin 306 that represents the scanned object as a matrix of volumetric units, or voxels 300. Each voxel 300 encodes a specific three-dimensional coordinate and spatial data, forming a precise geometric and structural model of the physical object. The voxel-based digital twin 306 can be generated either locally or remotely, enabled by connectivity to a local area network (LAN) and/or wide area network (WAN), such as a global Internet-based infrastructure.

In various scenarios, the voxel model generator 220 can ingest physical object scan data or CAD representations from geographically distributed sources. For instance, a field technician in Asia may scan a broken component using a mobile computing device 208B, while the voxel model generation and enrichment may occur in a centralized North American data center. This capability allows the system to globally generate and receive digital twins 306 over a WAN environment, facilitating collaborative design and just-in-time fabrication anywhere on the planet.

Once the voxel-based digital twin 306 is available, it can be stored in the design repository 204, which is a network-accessible storage resource capable of holding both unmodified digital twins 306 and enriched digital twins 412. The design repository 204 functions not merely as passive storage but includes version tracking, lineage documentation, environmental tagging, and regulatory compliance annotations. Each digital twin stored can be accessed by downstream systems for enrichment, simulation, or fabrication, ensuring reproducibility and auditability.

The module for generating enriched digital twins 216 is configured to access the digital twin 306 and associated environmental context data 408, such as temperature, pressure, vibration, chemical exposure, or other field-specific operating conditions. The module 216 comprises one or more digital twin processors 218 and machine-learned artificial intelligence (AI) processors 206, which together execute advanced inference models trained on historical degradation data, simulation datasets, and material performance curves.

This enrichment process begins with the AI processor 206 evaluating the deployment-specific conditions against a materials database 228, selecting optimal substitute materials based on predicted performance outcomes. The digital twin processor 218 then prepares the voxel space for metadata embedding, allowing simulation results and fabrication directives to be structurally encoded on a per-voxel basis. This collaboration between AI and digital twin processors transforms the digital twin 306 into an enriched digital twin 412, containing a voxel-based 400 structure enriched with metadata fields such as material substitution metadata 402, simulation metadata 410, environmental tagging metadata 404, fabrication instruction metadata 414, and custom parameters 406.

To enable secure deployment of these enriched twins, the secure transmission module 226 encrypts the enriched digital twin 412, assigns a cryptographically signed unique identifier (UID) 410, and logs the transmission to a tamper-resistant ledger if required. The transmission pathway can span LANs or WANs, depending on the fabrication site location. For instance, an enriched twin created in a central design hub may be securely transmitted to an additive manufacturing system 214 located in a field-based repair facility or remote industrial site, demonstrating the system's seamless operation across distributed physical and network topologies.

The additive manufacturing systems 214 are voxel-aware fabrication units capable of interpreting the embedded metadata at the voxel level, enabling them to dynamically adapt print head temperatures, material deposition rates, support structures, and reinforcement strategies according to region-specific manufacturing logic. This tight digital-to-physical mapping distinguishes the system from prior approaches in which fabrication merely followed static CAD geometries or surface meshes.

Oversight and control of this distributed process are provided by an administrator 302, who can use a computing device 208A or 208B to interact with system components. The administrator may monitor ongoing processes, review simulation outcomes, manage transmission permissions, manually override any module, or perform other functions, including the AI substitution engine, simulation module 222, metadata enrichment module 224, or transmission module 226, as may be required in a given operational or regulatory context. This human-in-the-loop capability ensures safety, accountability, and situational flexibility.

Unlike generic networks that serve only as transport layers for files, the present invention's network configuration includes context-aware orchestration logic, user-defined access controls, enriched routing rules, and state-managed module coordination. The network is purpose-built to handle object-aware data packets in which enriched digital twins 412 are treated as secure, structured, and actionable fabrication directives, not mere design files. This enables real-time collaboration, decentralized fabrication, and contextual adaptation from global design centers to field-deployable printers.

Consider a practical use case involving humanitarian logistics. A medical device enclosure must be manufactured in a remote coastal region subject to high salinity and humidity. A technician uses a local 3D scanner 212 and a mobile computing device 208B to generate a voxel-based digital twin 306. This model is transmitted via the WAN to a central facility where the AI processor 206 enriches it with corrosion-resistant materials and projected fatigue life simulation metadata. The resulting enriched digital twin 412 is then transmitted to a regional 3D printer 214 for fabrication, tailored not just to the design, but to the deployment environment, and documented with full traceability.

In an exemplary embodiment, the present invention incorporates a robust network-level security and access control framework to regulate who can generate, enrich, or fabricate physical objects 304 based on enriched digital twins 412. Access to the various modules, including the voxel model generator 220, digital twin processors 218, AI processors 206, and additive manufacturing systems 214, is governed by authenticated identity management protocols. These protocols can include multifactor authentication (MFA), public key infrastructure (PKI), role-based access control (RBAC), and cryptographic access tokens that validate an operator's or machine's authorization to execute a given function. This ensures that only designated personnel or verified systems can initiate fabrication, preventing unauthorized or rogue builds from occurring, which is especially critical in sectors with compliance or warranty constraints such as aerospace, medical, and defense manufacturing.

To further safeguard against fraud, product tampering, and illicit replication, each enriched digital twin 412 can be embedded with a unique cryptographic identifier (UID 410) at the time of metadata enrichment and stored in a tamper-evident transaction log, such as a distributed ledger or secure audit log maintained by the digital twin repository 204. When an enriched digital twin 412 is transmitted via the secure transmission module 226, it may include an access expiration window, geofencing constraints, or single-use fabrication flag, thereby preventing the same enriched twin from being fabricated multiple times or in unintended locations. These safeguards also enable traceable warranties—linking a physical product back to its enriched digital twin lineage, environmental assumptions, and authorized fabrication log. In some implementations, counterfeit protection measures such as embedded digital watermarks, secure fabrication tokens, or hash-chained voxel metadata may also be utilized, providing a technical deterrent to copying or fraudulent modification of fabrication instructions. Together, these features enable a secure, compliant, and auditable digital-to-physical manufacturing pipeline that is meaningfully distinct from generic or open-source fabrication workflows.

In an exemplary embodiment, the adaptive object fabrication system can be comprised of a network of specialized hardware modules and computing resources, each configured to perform distinct but interoperable functions that support the end-to-end process of generating, enriching, securing, and fabricating enriched digital twins. The following descriptions, for example and not a limitation, provide implementation-level details of the key components that together enable the system's distributed architecture, artificial intelligence-driven decision-making, and context-aware additive manufacturing capabilities.

Remote Data Processing Resource/Server 202

The remote data processing resource 202, also referred to as a server, can be implemented using one or more high-availability, rack-mounted blade servers or cloud-hosted virtual machines (VMs) provisioned with scalable compute and memory resources. In an exemplary embodiment, the server 202 comprises a multi-core processor (e.g., Intel Xeon Gold or AMD EPYC), a minimum of 128 GB ECC DDR4 RAM, and solid-state drive (SSD) arrays configured in RAID 10 for fast read/write access and fault tolerance. The server can be configured to run a secure operating system, such as a hardened Linux distribution (e.g., Ubuntu Server with AppArmor or SELinux enabled), and includes network interface controllers (NICs) supporting 10 Gbps or faster Ethernet connections. This server 202 hosts back-end services for orchestrating digital twin processing workflows, receiving incoming data from scanners or design repositories, and coordinating transmission and job scheduling for additive manufacturing endpoints across LAN/WAN environments. It may also include support for RESTful APIs, message queues (e.g., RabbitMQ or Kafka), and database management systems (e.g., PostgreSQL or NoSQL MongoDB clusters) to support modular and secure operation.

Design Repository Server 204

The design repository 204 functions as a centralized or distributed version-managed storage facility for digital twins 306 and enriched digital twins 412. In one implementation, the design repository may be hosted on a server with redundant failover support using dual Intel Xeon Silver processors, 256 GB RAM, and a hybrid storage stack comprising both NVMe SSDs for high-speed access and large-capacity SATA drives for archival storage. The server runs a containerized microservice architecture using Kubernetes or Docker Swarm to manage file versioning, permission layers, and metadata indexing. Object storage services, such as Amazon S3-compatible interfaces or MinIO, can be used to ensure scalable and geographically redundant access. File integrity is monitored through checksum validation (e.g., SHA-256 hashes) and secured by access control policies managed via role-based access control (RBAC) integrated with enterprise identity providers (e.g., OAuth2 or LDAP). This repository enables authenticated users and systems to access models based on security tier, compliance level, or production readiness.

AI Processing Server 206

The AI processor 206 is configured to perform high-volume machine learning inference and model-based prediction tasks related to material substitution and environmental durability assessment. The server can be implemented using one or more GPU-enabled computing platforms such as an NVIDIA DGX Station, or equivalent, equipped with at least two high-end GPUs (e.g., NVIDIA A100 or RTX 6000 Ada Generation), 512 GB RAM, and NVMe storage arrays. The AI processor hosts pre-trained machine-learned models (e.g., ensemble regression trees, graph neural networks, deep convolutional networks) that have been trained on domain-specific datasets encompassing historical failure modes, environmental stress profiles, material degradation curves, and manufacturing success/failure outcomes. Models are served using platforms such as TensorFlow Serving or ONNX Runtime, and can be updated over-the-air (OTA) using CI/CD pipelines. These processors form the computational core of the module 216 for generating enriched digital twins and are essential for transforming conventional voxel-based models into enriched, performance-aware digital twins 412.

3D Physical Object Scanner 212

The 3D scanning engine 212 can be implemented as a structured-light or laser-based volumetric scanning system, capable of generating dense point cloud data suitable for voxelization. In a preferred embodiment, the scanner includes a dual-camera system (minimum 12 MP resolution per camera) with an onboard infrared projector and depth sensor. A rotating platform and precision stepper motors allow for complete 360-degree scanning of physical object 304 surfaces. Onboard processing may be handled by an integrated GPU (e.g., NVIDIA Jetson AGX Orin or equivalent) to perform pre-processing tasks such as point cloud cleanup, mesh reconstruction, and voxel conversion in real-time. The scanner communicates with the voxel model generator 220 via a USB 3.1 or Ethernet interface, with data transfer rates sufficient to handle multi-gigabyte mesh datasets. Calibration routines are built-in to compensate for lens distortion, ambient lighting, and mechanical drift, ensuring high-fidelity reproduction of complex geometries.

Server That Supports Modules 218/222/224/226/228

The digital twin processor 218 and associated modules-namely the performance simulation module 222, metadata enrichment module 224, secure transmission module 226, and materials database 228—can be implemented as micro-services running on a shared high-availability clustered server platform. These modules are housed in a fault-tolerant environment using multi-node virtualization or container orchestration systems (e.g., VMware ESXi cluster, Kubernetes on bare metal). Each server node can feature 16-core AMD EPYC processors, 128 GB RAM, and dual NVMe SSDs with backup-to-tape storage for regulatory archiving. The performance simulation module 222 may leverage finite element analysis (FEA) engines like Abaqus or ANSYS, with GPU acceleration where applicable. The metadata enrichment module 224 includes rule-based engines and dynamic schema managers that interface with JSON-LD or XML-based metadata standards. The secure transmission module 226 includes encryption libraries (e.g., OpenSSL, Libsodium) and digital signature engines (e.g., RSA or ECDSA with SHA-3 hashing) to ensure authenticated and tamper-evident data exchange. The materials database 228 is typically a NoSQL document store indexed by environmental profiles, vendor certifications, and ISO compliance codes.

Additive Manufacturing System 214

The additive manufacturing system 214 comprises a multi-material, voxel-interpreting 3D printer capable of real-time parameter adaptation based on voxel metadata. In one embodiment, the system includes a multi-axis robotic gantry with a print head equipped with independent extrusion nozzles for polymer, ceramic, or metal feedstocks. Nozzle temperature ranges are independently controllable up to 500° C., and print beds can be actively heated and leveled. A dedicated onboard controller (e.g., ARM Cortex-A72 SoC with FPGA co-processor) is configured to parse enriched voxel metadata and dynamically adjust toolpath parameters such as layer height, extrusion width, infill pattern, and reinforcement strategy. The system connects to the network via gigabit Ethernet or fiber optics, and supports secure file intake via authenticated protocols such as SFTP or gRPC over TLS. Environmental sensors (temperature, humidity, vibration) are integrated for feedback control and compliance monitoring. Firmware-level support ensures that encrypted or tamper-evident enriched digital twins cannot be spoofed or misused in unauthorized manufacturing scenarios.

This tightly integrated system, comprising digital twin generation, enrichment, simulation, secure routing, and adaptive fabrication across LAN and WAN environments, transforms the role of the digital twin from passive representation to active fabrication blueprint. The invention's technical structure ensures that enriched digital twins 412 are dynamically informed by environmental conditions, tailored to available fabrication resources, and traceably delivered to authorized endpoints for real-world object reconstruction.

Referring to FIG. 5, there is illustrated one example of a use case for producing, storing, enriching, and additively manufacturing at least one enriched digital twin 412. This embodiment depicts a linear, single-instance adaptive fabrication workflow in which a voxel-based digital twin 306 is generated, enriched, and transmitted to an additive manufacturing system 214, enabling precise reconstruction of a physical object 304 optimized for its intended deployment environment.

In an exemplary embodiment, the process begins with the voxel model generator 220, which includes a 3D scanning engine 212 and a computing device 208A or 208B. The scanning engine captures the geometric and surface characteristics of the physical object 304, converting it into a voxel-based model 306. This model represents the object as a spatial matrix of voxels 300, with each voxel encoding positional and structural data that provides a high-resolution basis for downstream simulation and fabrication.

The generated digital twin 306 is transmitted to a remote data processing resource 202 via a network 210, which may include local area (LAN) or wide area networks (WAN), including the Internet. At the remote location, the digital twin is stored in a design repository 204. The repository can function as a versioned, indexed storage platform for unmodified digital twins, allowing asynchronous access by authorized modules for later enrichment or fabrication.

An enrichment workflow is initiated via the module for generating enriched digital twins 216, which comprises one or more digital twin processors 218 and machine-learned artificial intelligence (AI) processors 206. Environmental context data 408, representing expected conditions such as temperature, pressure, humidity, vibration, or chemical exposure, is fed into the system to guide context-specific enrichment. The AI processor applies trained predictive models—based on historical failure modes and degradation pathways—to select substitute materials and simulate performance under the specified environmental conditions.

The simulation module 222 and metadata enrichment module 224 operate in tandem to annotate the voxel-based model with manufacturing directives, material substitutions, structural reinforcements, and environmental performance predictions. The resulting enriched digital twin 412 encapsulates prescriptive voxel-level metadata, effectively transforming the digital twin from a descriptive asset into a machine-readable fabrication blueprint.

An administrator 302 oversees this process through a computing device 208A or 208B, monitoring system status, reviewing enrichment outputs, and validating AI-selected material substitutions. The administrator interface allows for manual override at critical stages, such as selecting a different material from the database 228, rejecting a simulated performance forecast, or injecting new environmental parameters into the enrichment logic. This human-in-the-loop design supports high-stakes use cases, such as aerospace or medical manufacturing, where compliance, traceability, and operator assurance are essential.

Once validated, the enriched digital twin 412 can be restored in the design repository 204 for archival or downstream reuse, or it may be routed to the secure transmission module 226. This module performs digital signing, encryption (e.g., AES-256, RSA, or other), and generates a unique identifier (UID) for each enriched twin. These security measures help ensure authenticity, prevent unauthorized duplication, and maintain chain-of-custody integrity, particularly in distributed fabrication environments spanning multiple geographic nodes.

The final stage involves transmission of the enriched digital twin 412 to an additive manufacturing system 214. This system interprets the embedded voxel metadata in real time during fabrication, adjusting layer height, toolpath, material deposition strategy, or reinforcement patterns as specified. The ability to locally adapt fabrication behavior at voxel resolution provides critical advantages in producing high-performance, environmentally resilient components without the need for post-processing or manual calibration.

Throughout the process, user/administrator 302 retains end-to-end visibility and operational authority, including the ability to pause, modify, or reroute any workflow stage. This centralized oversight adds operational flexibility and auditability to the pipeline, enabling selective approvals, quality checks, or last-minute parameter updates before committing a part to physical fabrication.

In contrast to FIG. 6, which illustrates the creation and management of multiple enriched digital twins for uncertain or variable deployment conditions, FIG. 5 showcases a streamlined, purpose-driven workflow optimized for known deployment scenarios. This single-twin enrichment path is particularly well-suited for field-replaceable units, mission-critical repairs, and just-in-time manufacturing where performance, compliance, and environmental fit are fully defined in advance.

Referring to FIG. 6, there is illustrated one example of a use case for generating, managing, and selecting among a plurality of enriched digital twins 412 based on varying anticipated deployment conditions. This embodiment differs from the linear enrichment flow of FIG. 5 by enabling parallel enrichment paths, wherein multiple enriched digital twins are created for the same physical object 304, each tailored to a distinct set of environmental context parameters.

In an exemplary embodiment, the process begins with the voxel model generator 220, which includes the 3D scanning engine 212 and a computing device 208A or 208B. A voxel-based digital twin 306 is generated from the physical object 304, capturing high-resolution spatial geometry and surface characteristics. This voxel-based structure, made up of voxels 300, provides the foundational geometry for context-specific enrichment.

The digital twin 306 is stored in the design repository 204, which can be a local or cloud-based server accessible via a local area network (LAN) or wide area network (WAN) 210. The repository acts as a secure archive and staging environment for enrichment workflows, and supports indexed retrieval for further processing.

In this use case, performance and environmental data 408 are received for multiple target deployment scenarios. These may include different climate zones, use environments (e.g., marine, desert, arctic), or structural loads, and can be entered manually, imported from planning databases, or derived from historical deployment records.

The module for generating enriched digital twins 216, comprising one or more digital twin processors 218 and machine-learned AI processors 206, executes multiple enrichment workflows in parallel. Each enrichment pipeline applies the received environmental context data 408 and leverages predictive failure modeling and material substitution logic to generate a tailored enriched digital twin 412. These digital twins differ not in geometry but in voxel-embedded metadata, including selected substitute materials, fabrication constraints, structural durability predictions, and localized reinforcements based on deployment-specific simulations.

A plurality of enriched digital twins 412 are created and stored back into the design repository 204, each tagged with metadata indicating the corresponding environmental conditions for which it was optimized. This approach enables on-demand selection of the most suitable enriched digital twin based on last-minute deployment assignments or evolving operational requirements.

An administrator 302 plays a vital oversight role throughout this branching workflow. Via a computing device 208A or 208B, the administrator can review each enriched digital twin 412, inspect simulated outcomes and substitution decisions, and manually flag or approve versions based on policy, compliance, or domain expertise. For instance, if one version predicts premature fatigue under vibration, the administrator may opt for a more conservatively reinforced version intended for high-dynamic environments.

Once an enriched digital twin 412 is selected from the repository—either automatically or by administrative intervention—it is passed to the secure transmission module 226. This module assigns a unique identifier (UID), applies digital signing, and encrypts the payload before transmission to the additive manufacturing system 214. The secure communication pipeline over LAN or WAN ensures integrity, authenticity, and IP protection for distributed manufacturing environments.

At the fabrication site, the additive manufacturing system 214 reads the voxel-based metadata to reconstruct the physical object 304 with context-appropriate material and process parameters. Depending on the enriched twin selected, the additive system may vary deposition strategy, material transitions, reinforcement geometry, or thermal settings, ensuring each fabricated object is precisely aligned to its designated deployment environment.

In contrast to FIG. 5, which is optimized for a known deployment environment and single enrichment pathway, FIG. 6 illustrates a multi-path, decision-ready framework. This is especially advantageous for global logistics, forward-deployed manufacturing units, mission-configurable components, and OEMs managing large fleets of identical equipment with diverse operating conditions.

The plurality-enriched architecture also supports version control, iterative optimization, and reusability. For example, enriched digital twins generated for a coastal climate may later be adapted for inland deployment by re-enriching only the affected metadata layers, without repeating the full scanning and simulation cycle.

As such, the FIG. 6 embodiment reflects the system's ability to support scalable, intelligent, and administrator-controlled adaptive object fabrication workflows under uncertainty, variability, and time-sensitive production constraints. The administrator 302 remains central to quality assurance, decision governance, and traceable fabrication authorization across the distributed digital twin ecosystem.

Figure 7:
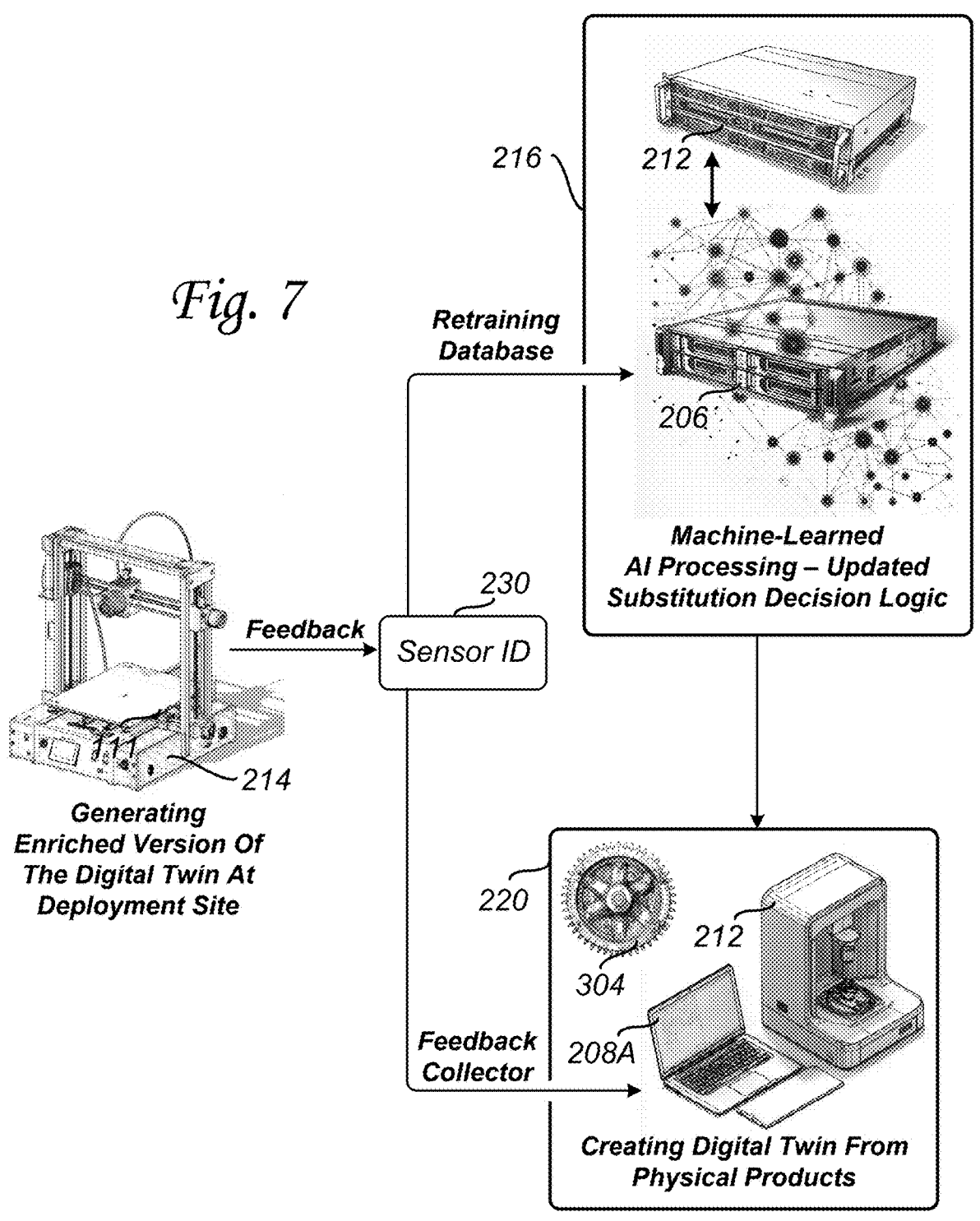
FIG. 7 illustrates an exemplary system for feedback-based enrichment and retraining, configured to improve material substitution decisions and fabrication intelligence through continuous learning from real-world deployment.

Referring to FIG. 7, there is illustrated an exemplary system for feedback-based enrichment and retraining, configured to improve material substitution decisions and fabrication intelligence through continuous learning from real-world deployment. This system illustrates how the present invention adapts over time by integrating live sensor data, AI retraining, and updated digital twin generation-features absent from prior static fabrication approaches.

In an exemplary embodiment, the Generating Enriched Version Of The Digital Twin At Deployment Site module 214 operates locally at or near the deployment environment, enabling last-mile enrichment of the digital twin using context-specific data. The resulting enriched digital twin incorporates predicted performance metadata and material substitution decisions tailored to the anticipated stressors at the site. After fabrication, the physical object 304 is monitored using one or more environmental or structural sensors collectively represented by Sensor ID 230. These sensors may include thermocouples, accelerometers, corrosion sensors, strain gauges, and other feedback devices. The resulting sensor data reflects real-world performance and usage profiles, which are leveraged to refine future substitution decisions and digital twin models.

Sensor ID 230 provides two streams of feedback to the overall system. One feedback path flows into the Feedback Collector, which feeds the Creating Digital Twin From Physical Products module 220. This pathway supports the regeneration or updating of digital twins using empirical data—capturing how a deployed object evolves over time due to fatigue, wear, or environmental exposure. This results in more accurate digital representations of existing objects, allowing the system to model changes and anticipate maintenance or redesign requirements.

The second feedback stream routes data into a Retraining Database, which aggregates performance data from a variety of deployments and environmental conditions. This database forms the foundation for retraining the system's AI-based material substitution engine, located in the Machine-Learned AI Processing-Updated Substitution Decision Logic module 216. This module updates the material selection models using historical degradation outcomes, newly available material data, and emerging failure patterns. In some embodiments, retraining occurs using federated learning across multiple fabrication sites, allowing each site to contribute anonymized insights to a global AI model without compromising proprietary data or device security.

In one embodiment, sensor data collected from deployed fabricated parts is transmitted to a retraining module that updates the AI substitution logic via federated learning. This allows the model to evolve based on real-world degradation patterns and deployment performance. Updated AI parameters are then used in future enrichment workflows to generate enriched digital twins with improved prediction accuracy and material selection logic.

The system is also configured to support digital twin models that rely on mesh-based geometry rather than voxel-based structures. These mesh-based models can still be enriched with material substitution metadata and performance annotations, allowing broader compatibility with traditional CAD workflows while still benefiting from the intelligent substitution and fabrication optimization features of the present system.

Moreover, the system accommodates both AI-driven and deterministic substitution engines. In scenarios where AI is not preferred or permitted, the system can use rule-based logic or predefined lookup tables that map deployment zones to validated material profiles. This ensures compliance with regulatory standards or operational constraints while preserving the adaptability of the platform.

In operation, in an exemplary embodiment, the present invention can be configured to provide a powerful feedback architecture that not only monitors fabricated objects in the field but also learns from them, enriching the substitution logic and digital twin enrichment pipeline with each deployment. This real-time intelligence loop offers improved material performance, lifecycle forecasting, regulatory alignment, and operational resilience—distinctly advancing beyond prior systems that rely on fixed models or one-time fabrication logic.

Referring to FIG. 8, there is illustrated an exemplary method for adaptive object fabrication that leverages enriched digital twin generation and machine-learned material substitution to produce physically fabricated parts tailored to real-world deployment environments.

In step 1102, environmental context data 408 is received, representing expected deployment conditions associated with a physical location in which a fabricated object 304 is intended to be deployed. This data can include, but is not limited to, thermal exposure ranges, humidity variability, salinity, radiation levels, vibration spectrum, pressure conditions, and chemical exposure profiles. In practical deployment scenarios, this data can be obtained from environmental databases, geolocation-based sensor networks, or site-specific surveys. For example, if a mechanical bracket is intended for offshore wind turbine use, the context data may include salt fog exposure cycles, high-velocity wind fatigue factors, and UV exposure levels-parameters that significantly impact material choice and fabrication strategy.

In step 1104, a digital twin 306 of the physical object 304 is received. The digital twin is implemented as a voxel-based 300 model, providing high-resolution geometric representation of the object's structure. Unlike traditional surface or mesh models, the voxel-based structure enables volumetric partitioning and spatially indexed data embedding. This allows each voxel unit to serve as a container not only for geometry, but for process-specific metadata related to manufacturing, material substitution, and performance simulation. This structural richness is essential for downstream adaptability.

In step 1106, a machine-learned artificial intelligence (AI) model 206 is applied to the received digital twin and the environmental context data. The AI model is trained to infer appropriate substitute materials by correlating historical failure data, degradation patterns, and simulated responses under environmental stressors. For instance, the AI model may determine that under high UV and corrosive chemical exposure, a polymer originally specified in the digital twin must be replaced with a UV-stabilized, chemical-resistant composite. The AI uses predictive modeling techniques—such as ensemble regression or graph neural networks—to identify and justify the optimal material candidate from the materials database 228.

In step 1108, an enriched version of the digital twin is generated using metadata enrichment module 224. This version is produced by annotating the voxel-based 300 model with metadata that includes, but is not limited to, material substitution data 402, simulation results 410 (e.g., predicted fatigue life, maximum temperature resistance), fabrication constraints (e.g., nozzle temperature, infill density), and environmental tagging metadata 404. The result is an enriched digital twin 412 that acts not merely as a static model, but as a fabrication directive tailored to real-world operating conditions. The enriched model can specify, for example, that the inner support ribs of a component are fabricated using reinforced material, while the external shell uses a lightweight composite—each voxel containing unique instructions based on localized functional demand.

In step 1110, the enriched digital twin 412 is transmitted via secure transmission module 226 to an additive manufacturing system 214. This transmission is not a passive file transfer; it may include encryption, digital signature validation, and verification against fabrication authorization protocols. Upon receipt, the additive manufacturing system interprets the voxel-level metadata and adjusts the fabrication process accordingly, modifying printhead speed, toolpath strategy, or material feed to conform to the enriched instructions. This ensures that the fabricated physical object 304 is not only geometrically accurate but also functionally optimized for its anticipated deployment conditions.

The practical applications of this method span a range of high-impact fields. In aerospace, parts can be pre-qualified for fatigue tolerance in extreme thermal cycles. In field-deployed medical devices, materials can be selected to resist body fluids or sterilization procedures. In humanitarian logistics, parts can be fabricated onsite using enriched digital twins downloaded from global repositories, each adapted to the local environmental and material availability constraints.

Unlike prior approaches that rely on static models and general-purpose material databases, the present method dynamically contextualizes design, simulation, and fabrication using a closed-loop AI and metadata-enriched digital twin pipeline. This end-to-end pipeline ensures that physical output reflects not only shape fidelity, but functional readiness under known and variable deployment scenarios-anchoring the invention in concrete technical application rather than abstract modeling.

Referring to FIG. 9, there is illustrated one example of an adaptive object fabrication system configured to implement voxel-level material substitution and enriched digital twin transmission using machine-learned contextual modeling and fabrication-aware metadata propagation.

In an exemplary embodiment, the system includes an input interface 1202 configured to receive a voxel-based digital twin 306 of a physical object 304. The digital twin comprises a three-dimensional matrix of voxels 300 encoding geometric shape, structural topology, and spatial coordinates of the object. Unlike conventional CAD or mesh models that define only surface geometry, this voxel-based representation enables fine-grained embedding of region-specific manufacturing and performance data. The input interface 1202 can be integrated with a local computing device 208 or remote data processing resource 202 connected via LAN/WAN 210, allowing digital twin retrieval from a global repository.

A data input module 1204 accepts environmental context data 408 that describes physical deployment conditions for the object. Such data can include temperature extremes, pressure cycles, radiation exposure, mechanical shock, corrosive chemical environments, or other parameters relevant to real-world performance. This module can pull data from geographically tagged environmental databases, IoT sensor arrays installed at deployment sites, or manual operator inputs. This context-aware input enables the system to move beyond generic design principles, dynamically tailoring each fabricated part to match its intended use scenario.

The material substitution engine module 1206 includes a machine-learned artificial intelligence (AI) processor 206 trained using predictive failure modeling across a variety of environmental stress scenarios. This AI processor evaluates the received environmental context data 408 and the digital twin 306 to determine one or more suitable substitute materials for reconstructing the object. The AI engine is trained on labeled datasets of historical degradation, stress simulation output, material fatigue profiles, corrosion studies, and thermomechanical performance logs. This enables probabilistic inference on which materials will perform optimally under given conditions. For example, if the deployment environment includes cyclical salt fog exposure and mechanical vibration, the AI may select a hybrid polymer-metal composite known to resist both delamination and oxidation.

A twin enhancement module 1208 creates an enriched digital twin 412 by embedding voxel-level metadata annotations into the original digital twin structure. This metadata includes identifiers for substitute materials 402, predicted failure metrics such as fatigue life or deformation thresholds 410, fabrication-specific constraints 414 (e.g., nozzle temperature, infill density), and environmental tagging 404 to localize regions of structural importance. The enriched digital twin 412 thus becomes a prescriptive digital artifact—not merely a model, but a fabrication directive containing context-specific engineering logic.

A communication module 1210 securely transmits the enriched digital twin 412 to an additive manufacturing system 214 for physical fabrication. Unlike prior approaches where CAD files are simply uploaded to a printer, the present system includes cryptographic validation, access authorization, and traceability mechanisms to ensure secure and policy-compliant fabrication. Transmission can occur over WAN infrastructures such as the Internet or private LANs, with endpoints limited to authorized fabrication systems capable of interpreting voxel metadata.

The practical application of this system is significant. In aerospace, where material performance under stress is critical, the system can fabricate turbine blade components tailored for thermal cycling and vibrational damping. In medical deployments, enriched digital twins can be customized to body chemistry profiles or hospital sterilization protocols. In humanitarian logistics, parts can be manufactured on-site in remote regions using enriched models downloaded from cloud repositories, pre-adapted to local temperature, dust, or altitude parameters.

Unlike prior approaches that treat the digital twin as a static design file or rely on look-up tables for material selection, the present invention integrates a trained AI engine that transforms the digital twin into an intelligent and responsive data structure. This closes the loop between sensing, simulation, design, and fabrication. The use of voxel-level metadata not only dictates geometric replication but commands adaptive behavior during material deposition, fulfilling a tangible transformation from digital input to engineered output. This positions the invention squarely within the domain of applied, non-abstract manufacturing technologies.

The system's modularity and network-aware architecture also ensure it can operate across distributed environments. For example, enriched digital twins can be generated centrally and fabricated locally, or vice versa, depending on resource availability and security policy. Each enriched digital twin carries a unique cryptographic ID, and all interactions are logged for traceability, compliance, and anti-counterfeiting control, supporting regulated industries like aerospace, defense, and healthcare.

The adaptive object fabrication system thus provides a unified, intelligent, and secure platform for the generation and deployment of enriched digital twins, enabling resilient and optimized object replication under varying real-world conditions.

Referring to FIG. 10, there is illustrated an exemplary method of adaptive object fabrication involving the generation, selection, and deployment of enriched digital twins tailored to different environmental deployment scenarios.

In step 1302, environmental data 408 is received describing anticipated performance-affecting conditions at one or more target deployment locations. This environmental data can include a wide range of variables such as ambient temperature ranges, exposure to corrosive agents, wind load patterns, mechanical vibration frequencies, UV radiation exposure, or elevation-related pressure changes. These parameters can be derived from predictive models, remote environmental sensor arrays, geotagged climate databases, or manual field survey inputs. For example, parts intended for use in a coastal marine setting may include environmental data specifying salt spray exposure, high humidity, and temperature fluctuations.

In step 1304, a plurality of enriched digital twins 412 are created from a base voxel-based digital twin 306 of a physical object 304 using a machine-learned artificial intelligence (AI) engine 206 trained to account for substitute materials based on the annotated deployment conditions. Each enriched digital twin 412 is tailored to a specific environmental context and comprises voxel-level metadata 400, including material substitution data 402, predicted performance metrics 410, and fabrication constraints 414. For instance, one enriched digital twin may specify flame-retardant polymers for high-heat conditions, while another recommends reinforced alloys for high-vibration applications. The AI engine learns from historical degradation datasets, performance simulations, material compatibility logs, and environmental durability profiles to infer and annotate performance-informed material choices suited to each deployment scenario.

In step 1306, the plurality of enriched digital twins 412 are received by a decision-making system or user interface associated with a computing device 208A/208B. This device allows operators or automated systems to evaluate available enriched models based on deployment requirements, security authorizations, fabrication capability, or policy constraints. The digital twins may be stored locally or accessed remotely from a design repository 204, and can include cryptographically signed identifiers, simulation logs, and compliance metadata.

In step 1308, an enriched digital twin 412 is selected from the plurality based on the environmental data 408 received in step 1302. The selection process can be automated or manually supervised, depending on system configuration. In some embodiments, the system computes a match score based on environmental alignment, predicted lifespan, and fabrication readiness. For example, in a disaster response scenario, where local ambient temperature and dust concentration are high, the system may prioritize an enriched digital twin pre-optimized for thermal stability and particulate resistance.

In step 1310, the selected enriched digital twin 412 is transmitted via secure transmission module 226 to a fabrication site equipped with additive manufacturing hardware 214. The transmission is encrypted and verified using cryptographic keys to ensure secure delivery and fabrication authorization. Once received, the additive manufacturing system interprets the voxel-level metadata to dynamically control fabrication parameters such as material deposition rate, nozzle temperature, infill geometry, or multi-material transitions. The result is a physical object 304 that is not only structurally accurate but engineered for operational survivability in its designated environment.

This method provides strong practical advantages in scenarios where a single object design must be adapted to diverse deployment contexts. Applications include global infrastructure repair kits where regional differences in climate or materials necessitate contextual fabrication; field fabrication of parts for aerospace vehicles with variable mission profiles; or disaster response toolkits fabricated onsite with locally optimized configurations. Unlike prior approaches that rely on generic or static models, this method creates a suite of enriched digital twins, each functioning as a performance-informed blueprint for manufacturing.

By integrating predictive AI modeling, environmental context analysis, voxel-level metadata structuring, and secure transmission, the present invention forms a cohesive and tangible digital-to-physical fabrication system. Each enriched digital twin generated and selected through this method is not merely descriptive—it directly informs material deposition behavior and fabrication logic at the machine level. The system does not claim the abstract idea of "choosing better materials"; rather, it implements a concrete technical architecture for generating manufacturing-specific, deployment-aware digital artifacts that can be securely and efficiently reconstructed into high-performance physical objects. This combination of AI-driven enrichment, contextual adaptability, and fabrication specificity establishes the system as a practical, non-abstract, and technically transformative method of adaptive object fabrication.

Referring to FIG. 11, there is illustrated a set of exemplary embodiments and configuration options that can be used interchangeably with the methods and systems of adaptive object fabrication described in prior figures. These embodiments provide flexibility and operational robustness across varying deployment, input, and fabrication scenarios.

In step 1402, the environmental context data 408 includes information related to one or more real-world deployment conditions, selected from a defined group consisting of temperature, humidity, salinity, radiation, pressure, vibration, and chemical exposure. These parameters can influence how materials degrade, deform, or fail over time. For instance, exposure to corrosive agents like saltwater or acidic vapors can reduce the structural integrity of metals or composites, while high-radiation environments may lead to polymer embrittlement. In an exemplary implementation, such environmental inputs may be collected from embedded or network-connected sensor arrays located at the intended deployment site, retrieved from global climate databases indexed by geographic coordinates, or manually entered by a technician using computing device 208A/208B. These real-world data inputs are key to tailoring each enriched digital twin 412 for its specific operating context.

In step 1404, prior to transmitting the enriched digital twin 412, the system performs cryptographic operations that secure and uniquely identify the model. A cryptographically signed unique identifier (UID) is generated using a secure hash function or digital signature scheme, ensuring the twin's authenticity and traceability. The enriched digital twin 412 can then be encrypted using public-key or symmetric-key encryption methods before being transmitted over LAN or WAN 210 to the target additive manufacturing system 214. This process protects against unauthorized access, copying, tampering, or man-in-the-middle attacks, and forms part of a robust digital supply chain that can enforce warranty, regulatory compliance, or anti-counterfeiting protocols.

In step 1406, the environmental context data 408 is sourced flexibly to support a range of real-world use cases. It can be manually entered via a technician interface, such as a tablet 208B at a remote worksite. Alternatively, it may be retrieved automatically from centralized planning databases that store deployment parameters for fleets of products or field installations. In another embodiment, historical deployment records can be mined to infer environmental parameters based on past performance, maintenance reports, or known failures in similar operational conditions. This adaptability ensures that the system can function effectively in both data-rich industrial environments and low-connectivity, resource-constrained field deployments.

In step 1408, the machine-learned artificial intelligence (AI) model 206 is designed to adapt over time by incorporating post-deployment feedback. For example, an object fabricated using enriched digital twin metadata may be embedded with IoT sensors to monitor temperature cycles, stress distributions, or vibrational loads during actual use. These data points are relayed back to the system and used to retrain or fine-tune the AI model. In other embodiments, service logs or field technician observations are digitized and structured for input into the training pipeline. This feedback loop ensures that future material substitution decisions become more accurate, contextually aware, and responsive to the nuances of real-world performance.

In step 1410, the base digital twin 306 can be received from multiple sources. These include cloud-based engineering services that host standardized part libraries, edge-scanning systems 212 deployed in the field to capture physical object geometry, or third-party design repositories 204. For example, a repair technician in the field might scan a broken bracket using a handheld scanner, send the resulting twin to a central enrichment server via WAN 210, and receive back an enriched twin ready for fabrication using materials appropriate for the local climate and stress profile. This distributed input architecture supports global deployment and distributed manufacturing.

To continually improve material selection and digital twin enrichment quality, the system can incorporate post-deployment performance feedback. In certain embodiments, feedback data-such as part failure timestamps, degradation patterns, maintenance logs, or operational anomalies—is received from edge monitoring systems, sensor-enabled deployments, or user-submitted reports. This feedback can be structured and processed by the machine-learned artificial intelligence (AI) model 206 to retrain the material substitution engine 1206. Over successive iterations, the AI system evolves its predictions and enrichment logic, adapting not only to environmental stressors but also to actual outcomes, resulting in more accurate future enriched digital twins 412 that reflect real-world performance histories.

In step 1412, the additive manufacturing system 214 is preferably a multi-material printer that can interpret and act upon voxel-based metadata 400. Each enriched voxel 300 can specify fabrication parameters such as nozzle temperature, layer height, infill density, material selection, and support structure strategy. The system can dynamically switch materials during a single build process, allowing for fine-tuned reinforcement of stress-bearing regions or environmental barrier zones. This level of control is unavailable in traditional manufacturing systems and allows for optimized part fabrication at the voxel level.

In step 1414, the AI model 206 is trained using a hybrid training dataset that includes both synthetic simulation data and empirical data from stress tests and historical failures. Synthetic data can be derived from finite element analysis (FEA), fluid-structure interaction models, or corrosion life-cycle simulations. Empirical data may include tensile strength tests, thermal aging results, or environmental fatigue experiments. The combination ensures that the AI model can reason about rare edge cases and extrapolate to previously unseen scenarios, thereby generating enriched twins that are robust under a wide variety of deployment conditions.

In step 1416, after the enriched digital twin 412 is received by the additive manufacturing system 214, a validation process is executed to confirm fidelity between the digital blueprint and the fabricated object. This can include pre-print simulation comparison, in-process monitoring using optical scanners or embedded sensors, and post-print quality assurance via dimensional or material property analysis. The results of this validation can be logged, reported back to the system administrator 302, and used for further enrichment of the digital twin or retraining of the AI model. This final step ensures that the physical object 304 meets or exceeds performance expectations, bridging the digital and physical domains with verifiable precision.

These enhanced capabilities provide practical, tangible improvements over prior approaches. The system does not merely suggest better materials—it governs, secures, and validates a full-stack digital-to-physical transformation pipeline that adapts to the specific needs and challenges of each object, use case, and environment. This deeply integrated and flexible architecture distinguishes the present invention as a non-abstract, application-specific solution to context-aware fabrication.

Referring to FIG. 12, there is illustrated a further set of exemplary embodiments that may be implemented interchangeably with, or as extensions of, the adaptive object fabrication methods disclosed in earlier figures. These embodiments emphasize simulation-enhanced enrichment, metadata-driven fabrication specificity, and secure, auditable transmission workflows, collectively reinforcing the applied, non-abstract nature of the present invention.

In step 1418, the twin enhancement module 1208 includes a simulation engine—such as performance simulation module 222—configured to model physical properties relevant to the object's intended deployment environment. These properties include, but are not limited to, heat resistance, vibrational fatigue, and corrosion risk. The simulation engine uses geometric data from the digital twin 306 and environmental context data 408 to perform finite element analysis (FEA), thermal distribution modeling, and environmental interaction predictions. For example, in a mining application, corrosion and fatigue simulations for dust-exposed brackets help inform whether to reinforce joints or substitute high-durability polymer composites. The results are embedded as voxel-specific metadata in the enriched digital twin 412, forming a simulation-enriched fabrication blueprint tailored to the operating domain.

In step 1420, the communication module 1210 applies cryptographic operations to each enriched digital twin 412 before transmission to additive manufacturing systems 214. These operations generate a unique identifier (UID) using a secure hash algorithm (e.g., SHA-256), optionally signed using public-private key encryption. The payload is further encrypted using AES-256 or RSA to ensure confidentiality and tamper-resistance during transit across LAN or WAN 210. The UID may be stored in a distributed ledger for later verification. This cryptographic treatment ensures that enriched digital twins cannot be duplicated or spoofed, supporting authenticity, chain-of-custody, and IP protection across distributed fabrication networks.

In step 1422, the data input module 1204 accepts user-defined constraints that directly influence AI decision-making. These constraints can be entered through graphical interfaces or structured configuration files and may include conditions such as allowable cost ranges, regulatory exclusions (e.g., no lead content), preferred suppliers, and even constraints based on sustainability goals. These constraints are embedded into the input pipeline of the AI engine 206 and directly impact material selection logic and enrichment parameters. As a result, stakeholders can enforce operational policies and compliance requirements, which traditional AI systems typically ignore or bypass.

The data input module 1204 can also include a configuration interface for incorporating user-defined constraints into the material substitution logic. These constraints may relate to sustainability goals, sourcing limitations, cost ceilings, safety regulations, or production priorities. For instance, an organization may restrict material substitution to non-toxic, recyclable polymers below a specific dollar-per-kilogram threshold. These constraints are embedded into the decision-making architecture of the AI model 206, enabling domain-specific customization that aligns with project requirements, ethical sourcing policies, or industry mandates without manual override of the entire enrichment process.

In step 1424, the AI material substitution engine 1206 accesses a distributed material property database 228 that is synchronized across global nodes. This database includes real-time material performance data, supplier availability, compliance certifications, and experimental datasets. It is updated continuously via external sources, such as vendor uploads or IoT sensors on test parts. For example, when a new biodegradable polymer becomes available with verified thermal resistance, the database update can immediately influence the AI's material substitution decisions for environmentally sensitive parts.

In step 1426, the voxel-based metadata includes predictive annotations about the expected operational lifetime of each part or region thereof. These annotations are derived from simulation module 222 outputs and include structured metadata fields such as "predicted_lifetime_hours," "fatigue_index," and "degradation_rate." These forecasts are tailored based on the enriched twin's embedded environmental context and material profile. In field service applications, this information may be used to prioritize maintenance, plan replacements, or even predict systemic failures before they occur.

In step 1428, each enriched digital twin includes voxel-level fabrication constraints that enable highly adaptive manufacturing. Constraints such as layer thickness (e.g., 50 microns in high-resolution regions), toolpath optimization parameters (e.g., shortest-path infill), and localized reinforcement instructions (e.g., multiple passes or support ribbing) are embedded within the voxel data. This data is interpreted by the additive manufacturing system 214 during print execution to dynamically modify its behavior on a per-region basis. Unlike generic G-code or STL files, this allows for precise, adaptive fabrication within a single build session.

In step 1430, the durability metadata embedded within the enriched digital twin varies depending on the classified environmental zones. For instance, a part tagged for "tropical high-humidity" deployment will include corrosion mitigation instructions, while a "space vacuum" classification would prompt specifications for outgassing resistance and UV hardening. This classification system enables dynamic enrichment strategies tailored to geolocation, function, or regulatory region, and can be cross-validated with deployment records or asset registries.

The enriched digital twin 412 may include voxel-specific durability annotations based on environmental zone classification. During enrichment, contextual data such as deployment region, altitude, humidity, chemical exposure, or vibration zone may be used to tag each voxel with localized durability expectations. For instance, voxels designated for installation in a marine salt spray environment may receive corrosion-mitigating reinforcements, while parts tagged for desert deployments may include UV-resistant coatings. This environmental annotation capability allows enriched digital twins to represent not only structural geometry but also deployment-specific adaptations that extend part lifespan and reduce field failure rates.

In step 1432, the transmission of enriched digital twins is logged into a distributed ledger system, such as Hyperledger Fabric or Ethereum-based enterprise blockchains. Each log entry includes UID, origin node, recipient endpoint, timestamp, and digital signature. This immutable ledger provides tamper-proof traceability across the supply chain, enabling digital forensics, warranty enforcement, audit compliance, and anti-counterfeiting validations. The ledger can be queried to confirm fabrication authenticity or provide regulators with a verified history of object generation and deployment.

To support verifiable traceability across distributed supply chains, the system can record enriched digital twin transmissions to a distributed ledger or blockchain network. Each transaction may include a cryptographic unique identifier (UID), source system, recipient endpoint, timestamp, and associated digital signatures. Once committed to the ledger, this immutable record ensures an auditable chain-of-custody for the enriched digital twin 412 from enrichment to physical reconstruction. The ledger entry can be queried by manufacturers, regulatory auditors, or quality assurance personnel to verify the authenticity and handling of enriched digital content across global fabrication networks.

Together, these embodiments equip the present system with adaptive, secure, and auditable capabilities tailored to the nuances of modern fabrication workflows. Rather than offering generic AI recommendations or surface-level encryption, the system delivers a multi-layered digital intelligence pipeline that enhances the geometry, composition, and lifecycle resilience of the final fabricated object. Its metadata-driven approach enables additive manufacturing systems to operate with precision under environmental constraints, validating the enriched twin's role not merely as a file, but as a directive blueprint for real-world transformation.

Referring to FIG. 13, there is illustrated a further set of exemplary embodiments that can be interchangeably used with the adaptive object fabrication methods and systems previously disclosed. These embodiments reinforce the practical and non-abstract nature of the invention by introducing intelligent indexing mechanisms, compliance-aware digital twin management, and cryptographically enforced fabrication authorization. Together, these features form an operational framework that not only enables the generation of enriched digital twins 412 but also governs how and where those twins can be utilized—closing the loop between secure digital asset management and real-world additive manufacturing execution.

In step 1434, the system indexes the plurality of enriched digital twins 412 based on performance thresholds and regulatory compliance attributes. This indexing is performed via a searchable metadata schema within the design repository 204 or within a distributed material and object registry network accessible via WAN 210. Each enriched digital twin 412 includes metadata fields populated during enrichment (e.g., from metadata enrichment module 224) that describe characteristics such as predicted lifetime, fatigue resistance, chemical stability, bio-compatibility, and certifications like ISO 13485, FDA 510 (k), or ITAR classification. These metadata tags are used to populate an indexed catalog that supports filtered retrieval based on desired operating conditions or regulatory environments. For example, in a use case involving replacement of worn aerospace components, the user can search for digital twins certified for cyclic temperature extremes and aerospace-grade alloy substitution. In contrast to prior approaches where digital assets were retrieved by file name or generic part number, the present invention provides performance-aligned digital twin discovery, ensuring operational fitness and simplifying compliance workflows.

In exemplary embodiments, the system can index the plurality of enriched digital twins based on performance thresholds and regulatory compliance attributes. These indexed metadata layers allow for rapid search, filtering, and selection of digital twins suitable for jurisdiction-specific deployment. For example, enriched digital twins intended for aerospace use may be tagged with FAA-compliance markers and minimum fatigue resistance ratings. A user or automated module can query the indexed design repository 204 to locate only those twins satisfying specified criteria such as ISO corrosion resistance standards or MIL-SPEC mechanical tolerances, streamlining compliant fabrication workflows.

In step 1436, the system performs a verification process prior to transmitting an enriched digital twin 412 to an additive manufacturing system 214. This process involves validating a digitally signed certificate associated with the enriched digital twin, which is generated and applied by the communication module 1210 during or after enrichment. The certificate may include cryptographically secured information such as: the identity of the enrichment originator, expiration date of authorization, intended fabrication domain, fabrication quantity limits, encryption key fingerprint, and access tier level. Before transmission, the system compares this certificate against a live access policy engine to determine whether fabrication is currently authorized. For example, in a medical device production scenario, enriched twins may be approved only for production at a licensed Class 7 cleanroom facility within a particular region and time frame. If the receiving facility or requested fabrication date falls outside these parameters, the system blocks transmission and flags an audit event.

This certificate-based authorization workflow provides robust safeguards against unauthorized or unintended fabrication. Unlike prior approaches that treat design files as static downloadable objects, the present invention dynamically enforces lifecycle governance for each enriched digital twin, ensuring fabrication occurs only under approved, validated, and traceable conditions. Additionally, the certificate itself can be validated using public key infrastructure (PKI), or its transmission and state changes can be logged into a distributed ledger system, such as Hyperledger Fabric or Ethereum-based enterprise chains. This provides an immutable audit trail that supports digital forensics, anti-counterfeiting validation, warranty enforcement, and regulatory compliance documentation.

To control downstream object production and mitigate risks of unauthorized replication, the system can implement a digital certificate-based fabrication authorization layer. Before transmission of an enriched digital twin 412 to an additive manufacturing system 214, the communication module 1210 can verify a digitally signed certificate that authenticates both the requesting fabrication node and the associated user. The certificate may contain cryptographic credentials issued by a trusted authority, usage permissions, expiration terms, and embedded object-specific fabrication rights. This ensures that only approved systems and users can initiate object production, enabling secure control of distributed manufacturing privileges and supporting intellectual property enforcement.

Taken together, the features disclosed in FIG. 13 represent a significant advancement over traditional CAD/CAM or generative design pipelines. The indexing capability transforms enriched digital twins 412 into queryable digital assets aligned to engineering, compliance, and deployment requirements. The certificate-based authorization ensures that even when enriched twins are distributed globally via WAN 210, their fabrication cannot be executed without explicit, verified approval. These capabilities reinforce that the system is not merely a generic software stack, but a context-sensitive, policy-bound, real-world fabrication control framework that converts enriched digital twins into actionable, secure, and domain-specific manufacturing blueprints.

From a practical application standpoint, this enables distributed manufacturers, regulatory bodies, and enterprise stakeholders to collaborate across geographies while retaining centralized control over fabrication quality, legal compliance, and IP protection. Whether in defense, aerospace, healthcare, or infrastructure maintenance, the present invention ensures that only the right part gets made, at the right place, using the right materials—and that this is verifiable both before and after fabrication.

In an exemplary embodiment, the AI-based substitution engine may use graph neural networks (GNNs), ensemble methods such as random forests, or deep reinforcement learning agents trained on degradation data sets. Voxel metadata is mapped to fabrication directives using a mapping schema that converts metadata fields such as material_id, fatigue_cycles_to_failure, and print_temperature_C into printer instruction sets. Deployment-specific environmental data is sourced from public and proprietary APIs, including but not limited to NASA's EARTHDATA for radiation and pressure, and OSHA or NIOSH databases for chemical exposure profiles.

Figure 14:
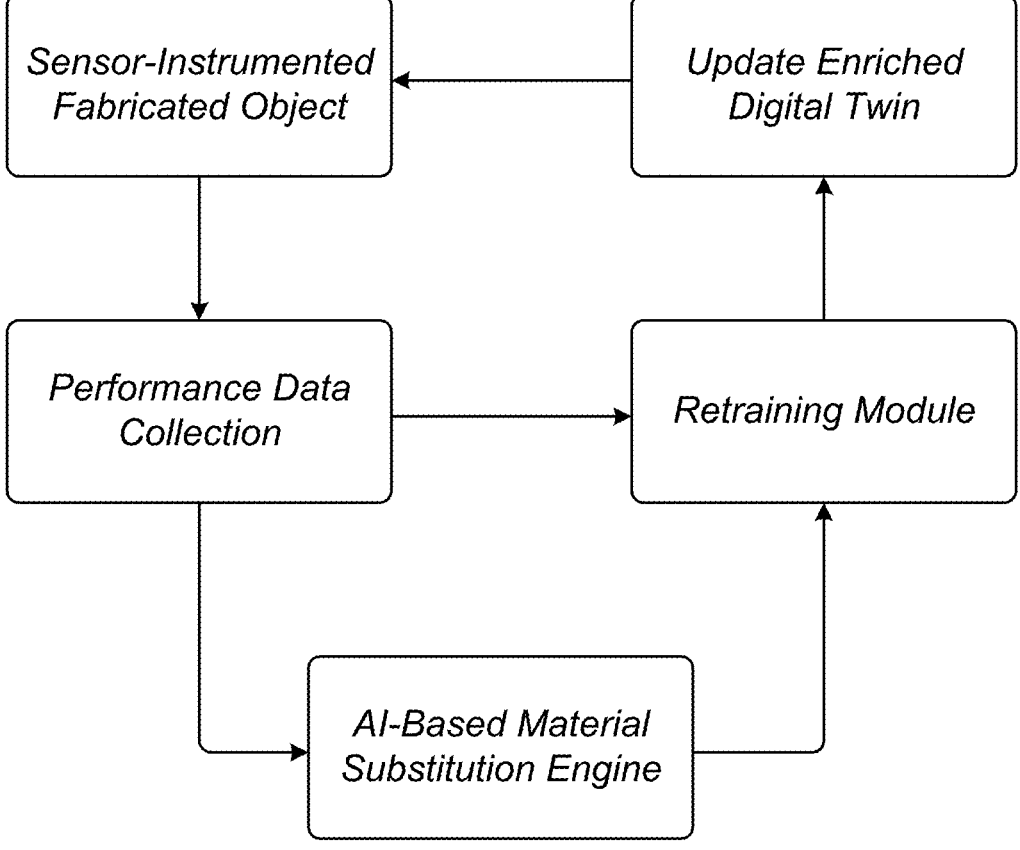
FIG. 14 illustrates one example of a feedback-driven retraining architecture for adaptively improving material substitution decisions in object fabrication systems.

FIG. 14 illustrates a feedback-driven retraining architecture for adaptively improving material substitution decisions in object fabrication systems. In this embodiment, a sensor-instrumented fabricated object is deployed and monitored in real-world environmental conditions to collect post-deployment performance data. These embedded or externally applied sensors may monitor variables such as strain, temperature, humidity, corrosion rate, mechanical fatigue, or structural deformation, depending on the application domain. Data from these sensors is transmitted back to a retraining module, which aggregates the performance metrics and contextual metadata for evaluation.

This feedback loop enables periodic or event-triggered updates to the AI-based material substitution engine, ensuring that material selection logic becomes more accurate over time by learning from actual in-field outcomes rather than relying solely on simulated predictions. Notably, this process improves both predictive fidelity and decision robustness in diverse deployment zones.

The retraining module can implement various learning techniques, including supervised machine learning, unsupervised clustering for anomaly detection, or hybrid models integrating empirical and synthetic training sets. In preferred embodiments, retraining may occur via federated learning frameworks, which allow aggregation of insights from multiple fabrication sites without transferring raw sensor data, thus preserving security and privacy.

The output of the retraining process is an updated enriched digital twin, which reflects not only the original simulation-based metadata but also insights gained from real-world performance. These updates may manifest in more accurate annotations for material fatigue life, environmental degradation sensitivity, or fabrication constraints.

By continuously incorporating sensor-driven insights into the AI engine, the system enables self-optimizing material selection, durability annotation, and digital twin enrichment for future fabrication cycles. This dynamic retraining capability contrasts sharply with static material selection methods of earlier systems, which were typically rule-based, non-adaptive, and incapable of evolving post-deployment.

This figure directly supports embodiments involving adaptive AI retraining, performance data feedback loops, and federated learning-based model refinement—all of which enable smarter, more context-aware object fabrication.

The capabilities of the present invention can be implemented in software, firmware, hardware, or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

While the preferred embodiment of the invention has been described, it will be understood that those skilled in the art, both now and in the future, may make various improvements and enhancements which fall within the scope of the claims which follow. These claims should be construed to maintain the proper protection for the invention first described.

What is claimed is:

1. An adaptive object fabrication method comprising:
receiving environmental context data representing expected deployment conditions associated with a physical location in which a fabricated object is intended to be deployed;
receiving a digital twin of a physical object, wherein the digital twin comprises a voxel-based model with geometric data;
applying an artificial intelligence (AI) model that is machine-learned to the digital twin and the environmental context data to select one or more substitute materials for reconstructing the physical object, wherein the AI model is trained to predict object performance and failure risk under environmental stress conditions based on historical degradation data;
generating an enriched digital twin version of the digital twin by annotating the voxel-based model with metadata corresponding to the selected substitute materials and predicted performance attributes;
transmitting the enriched digital twin to an additive manufacturing system configured to fabricate a physical instance of the object using the selected substitute materials in accordance with the voxel-based model, including the metadata;
collecting performance data from a deployed instance of the fabricated object; and
retraining the artificial intelligence model, for subsequent material substitution decisions, using a federated learning framework that aggregates performance data from multiple fabrication deployments.

2. The method of claim 1, wherein the environmental context data includes data related to at least one condition selected from the group consisting of temperature, humidity, salinity, radiation, pressure, vibration, and chemical exposure.

3. The method of claim 1, further comprising encrypting the enriched digital twin and assigning a unique identifier (UID) prior to transmission.

4. The method of claim 1, wherein the environmental context data is manually entered, retrieved from a planning database, or derived from historical deployment records.

5. The method of claim 1, wherein the AI model adapts over time by incorporating post-deployment feedback data to improve future material substitution outcomes.

6. The method of claim 1, wherein the digital twin is received from a third-party design repository, edge-scanning system, or cloud-based engineering service.

7. The method of claim 1, wherein the fabrication system comprises a multi-material additive manufacturing device capable of interpreting voxel-based material metadata.

8. The method of claim 1, wherein the AI model is trained using a combination of synthetic simulation data and empirical stress test datasets.

9. The method of claim 1, wherein the additive manufacturing system executes a validation process to confirm fidelity of the reconstructed object with the annotated digital twin.

10. The method of claim 1, wherein the digital twin comprises a mesh model or a voxel-based model annotated with material substitution metadata, the substitute material is selected using a machine-learned artificial intelligence model, and either a deterministic rule-based engine based on environmental conditions, or a look-up table indexed by deployment zones and prevalidated material profiles.

11. An adaptive object fabrication system comprising:
an input interface configured to receive a digital twin of a physical object, wherein the digital twin includes a voxel-based model of geometric information;
a data input module configured to accept environmental context data representative of physical deployment conditions;
a material substitution engine comprising one or more processors executing a machine-learned artificial intelligence (AI) model configured to select substitute materials based on the environmental context data and the digital twin received, the machine-learned AI processor being trained using predictive failure modeling;
a twin enhancement module configured to create an enriched digital twin by annotating the digital twin with material substitution metadata and simulated performance predictions, based, in part, on the environmental context data; and
a communication module configured to transmit the enriched digital twin to an additive manufacturing system for reconstruction of the physical object using the selected materials;
wherein performance data from deployed instances of the plurality of enriched digital twins is collected, and the material substitution engine, including the machine-learned artificial intelligence processor, is retrained for subsequent material substitution decisions, using a federated learning framework that aggregates performance data from multiple deployments of the plurality of enriched digital twins.

12. The system of claim 11, wherein the twin enhancement module includes a simulation engine configured to model at least one property selected from the group consisting of heat resistance, vibrational fatigue, and corrosion risk.

13. The system of claim 11, wherein the data input module is configured to accept user-defined constraints for substitution material selection.

14. The system of claim 11, wherein the material substitution engine accesses a distributed material property database updated in real time.

15. The system of claim 11, wherein the annotated metadata includes expected part lifetime under a defined environmental loading profile.

16. The system of claim 11, wherein the AI engine is updated based on feedback collected from deployed objects monitored by environmental or structural sensors.

17. An adaptive object fabrication method comprising:
receiving environmental performance data describing anticipated conditions at one or more target deployment locations;
creating a plurality of enriched digital twins of a physical object using a machine-learned artificial intelligence (AI) engine trained to incorporate substitute materials based on annotated deployment conditions, including predictive failure modes and environmental durability profiles associated with different deployment conditions, wherein each of the plurality of enriched digital twins comprises a voxel-based model annotated with material substitution metadata and predicted performance characteristics tailored to a corresponding deployment condition;

selecting an enriched digital twin from the plurality of enriched digital twins based on the annotated deployment conditions that correspond to the environmental data received;

transmitting the enriched digital twin to a fabrication site equipped with additive manufacturing hardware configured to reconstruct the physical object using the substitute materials;

collecting performance data from deployed instances of the plurality of enriched digital twins; and retraining the machine-learned artificial intelligence engine, for subsequent material substitution decisions, using a federated learning framework that aggregates performance data from multiple deployments of the plurality of enriched digital twins.

18. The method of claim 17, wherein each enriched digital twin of the plurality of enriched digital twins includes voxel annotations specifying fabrication constraints selected from the group consisting of layer thickness, toolpath optimization, and localized reinforcement.

19. The method of claim 17, wherein the enriched digital twin includes durability annotations that vary according to environmental zone classification, and wherein the plurality of enriched digital twins are indexed based on performance thresholds and regulatory compliance attributes to facilitate environment-specific fabrication decisions.

20. The method of claim 17, wherein transmission of the enriched digital twin is logged in a distributed ledger system for traceability.

* * * * *